(12) United States Patent
McGrail et al.

(10) Patent No.: US 6,437,080 B1
(45) Date of Patent: Aug. 20, 2002

(54) PROCESS FOR PREPARING POLYARLETHERS

(75) Inventors: Patrick Terence McGrail; Jeffrey Thomas Carter, both of Middlesbrough (GB)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/645,229

(22) Filed: Aug. 24, 2000

Related U.S. Application Data

(63) Continuation of application No. PCT/GB99/00540, filed on Feb. 22, 1999.

(30) Foreign Application Priority Data

Feb. 24, 1998 (GB) .............................................. 9803714

(51) Int. Cl.⁷ .............................................. C08G 75/00
(52) U.S. Cl. ...................... 528/171; 528/174; 528/487; 528/493; 528/495; 528/499; 528/502 R; 528/503
(58) Field of Search ................................ 528/171, 174, 528/487, 493, 495, 499, 502 R, 503

(56) References Cited

U.S. PATENT DOCUMENTS

| | | | |
|---|---|---|---|
| 3,941,748 A | 3/1976 | King ............................ 260/47 |
| 4,432,910 A | 2/1984 | Findeisen ................ 260/545 R |
| 4,663,427 A | 5/1987 | Matsuo et al. ............... 528/211 |
| 4,866,156 A | 9/1989 | Lau et al. .................... 528/219 |
| 4,987,171 A | 1/1991 | Brugel ......................... 524/396 |

FOREIGN PATENT DOCUMENTS

| | | | | |
|---|---|---|---|---|
| EP | 0375287 | 12/1988 | ........... C08G/65/40 |
| EP | 0311349 | 4/1989 | ........... C08L/81/06 |

*Primary Examiner*—Duc Truong
(74) *Attorney, Agent, or Firm*—Van Tassel & VandenHoff; Fran Wasserman

(57) ABSTRACT

Process for the preparation of a polymer composition comprising at least one aromatic or a mixture thereof, the process comprising: i) obtaining a reaction mixture comprising polymer precursors in a first fluid boiling in excess of 100 C.; ii) subjecting the reaction mixture to a first elevated temperature in excess of 100 C. to generate the alkali metal salts of polymer precursors and the polymer reaction products thereof; and iii) subjecting the reaction product mixture to at least a second temperature and isolating the reaction product in the form of a polymer composition which is substantially insoluble in a second fluid, form the first fluid which is substantially soluble in the second fluid, by contacting with an amount of second fluid; wherein the process is conducted in substantial absence of an effective amount of an azeotrope; novel intermediates thereof, polymer composition obtained thereby; resin formulation thereof; method for manufacture of composites thereof, and uses thereof.

31 Claims, 12 Drawing Sheets

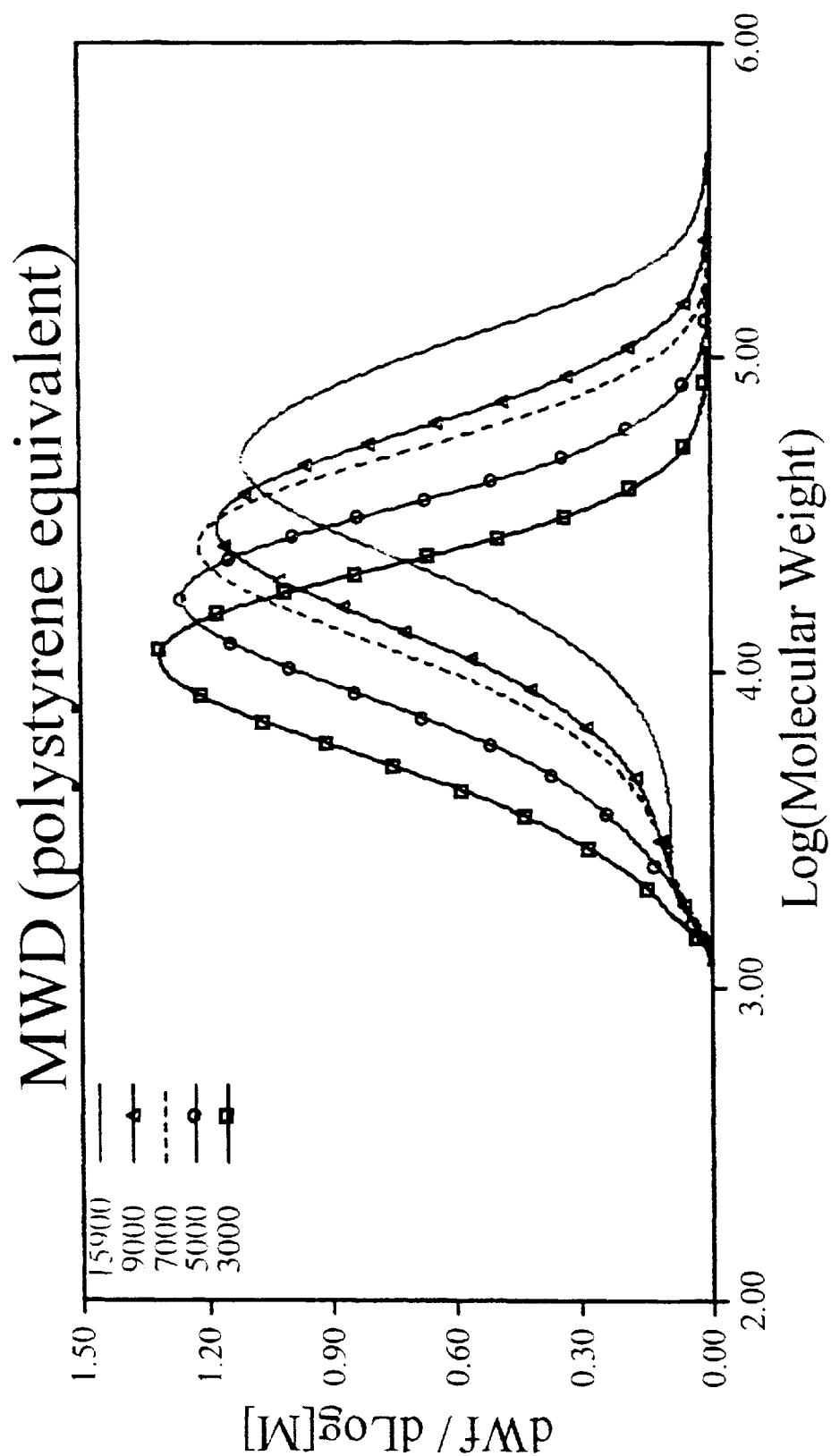
Figure 1.1

FIGURE 1.2 Results of GPC Analysis

| | | | |
|---|---|---|---|
| Number Average | 7684 | Intrinsic viscosity | 0.2297 |
| Weight Average | 17191 | Peak Molecular Weight | 16279 |
| Z Average | 29361 | Dispersity | 2.237286 |
| Viscosity Average | 16005 | Z avg / W avg | 1.707946 |
| Z + 1 Average | 42850 | Z + 1 avg / W avg | 2.492593 |

Conditions of GPC Analysis

Report method:     AVNMP95     Analysis Method:     AVNMP95
Calibration method: AVNMP95    Normalization:       none
Baseline:    Start  16.54min   End                  38.27 min
Number of data points in baseline region
Processing:  Start  25.52 min  End                  36.21 min
Number of slices    50         Area rejection       0.000
Negative slices                Disabled
Molecular Weight calculation by Narrow Standard Universal Calibration Curve
Mark-Houwink Equation:   Start time     k          alpha
                         0.00           0.0001330  0.770000

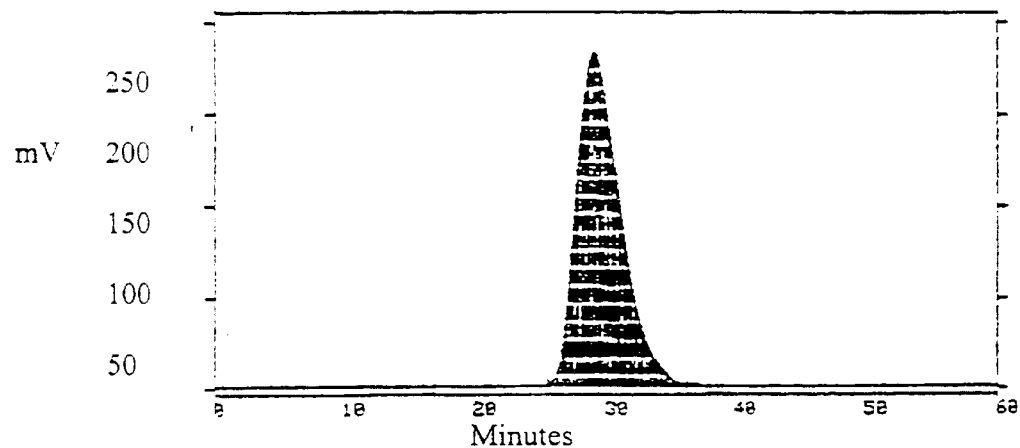

Distribution plot for AVNMP7 Manual Inject # 1 Ch 1

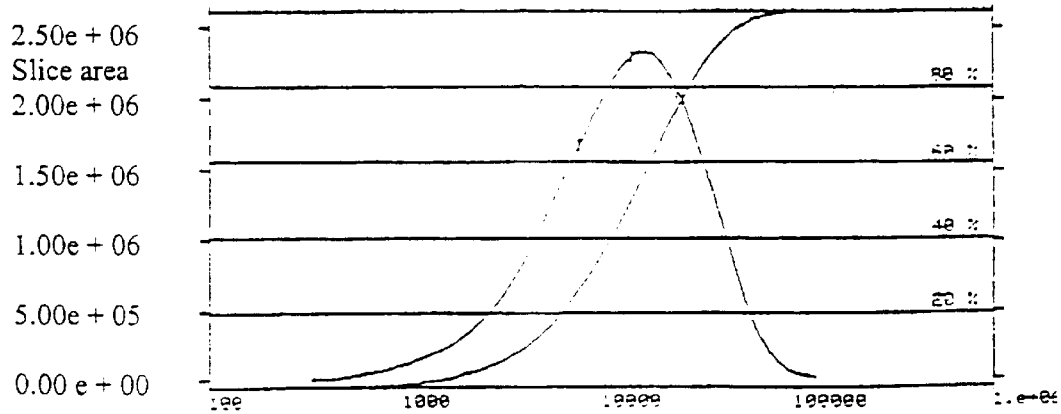

Figure 1.2

FIGURE 1.3 Results of GPC Analysis

| | | | |
|---|---|---|---|
| Number Average | 7317 | Intrinsic viscosity | 0.2273 |
| Weight Average | 16953 | Peak Molecular Weight | 16485 |
| Z Average | 28622 | Dispersity | 2.316918 |
| Viscosity Average | 15792 | Z avg / W avg | 1.688325 |
| Z − 1 Average | 41221 | Z − 1 avg / W avg | 2.431467 |

Conditions of GPC Analysis

Report method:     AVNMP95     Analysis Method:     AVNMP95
Calibration method: AVNMP95    Normalization:       none
Baseline:   Start  21.72 min   End                  38.27 min
Number of data points in baseline region
Processing: Start  25.55 min   End                  35.73 min
Number of slices          50   Area rejection       0.000
Negative slices                Disabled
Molecular Weight calculation by Narrow Standard Universal Calibration Curve
Mark-Houwink Equation:   Start time    k            alpha
                         0.00          0.0001330    0.770000

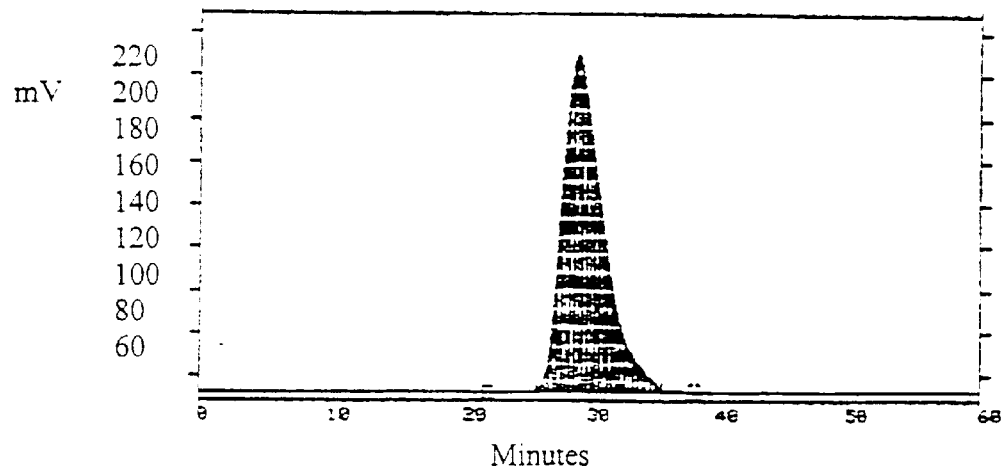

Minutes

Distribution plot for AVNMP7 Manual Inject # 1 Ch 1

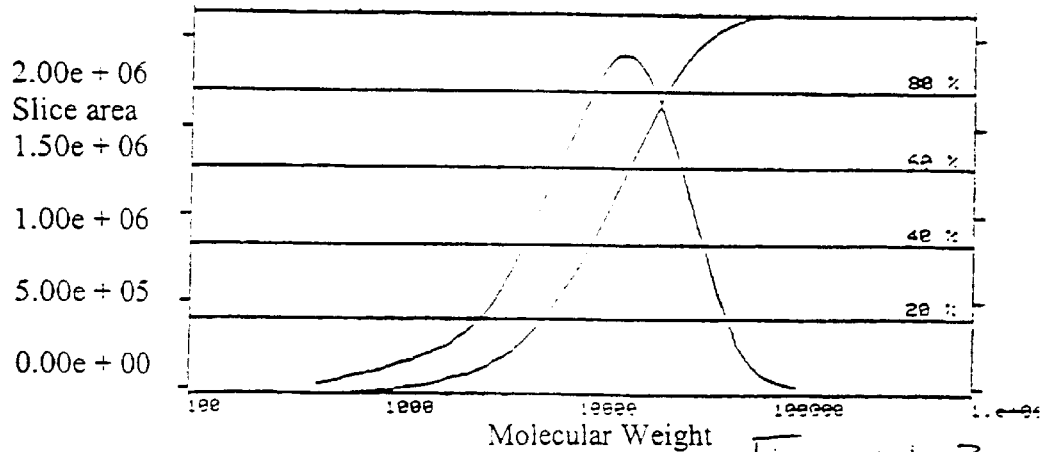

Molecular Weight

Figure 1.3

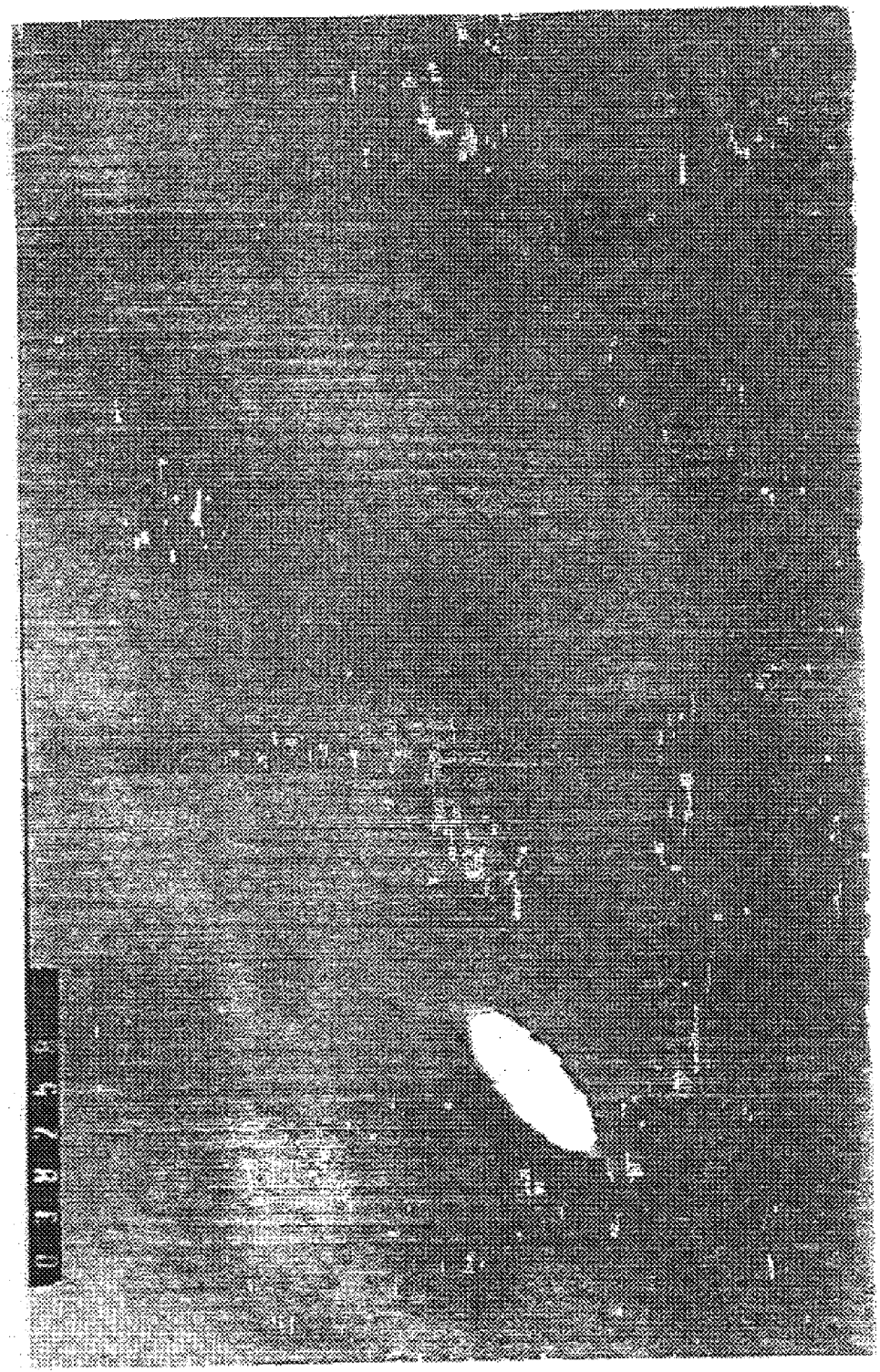
Figure 2.1

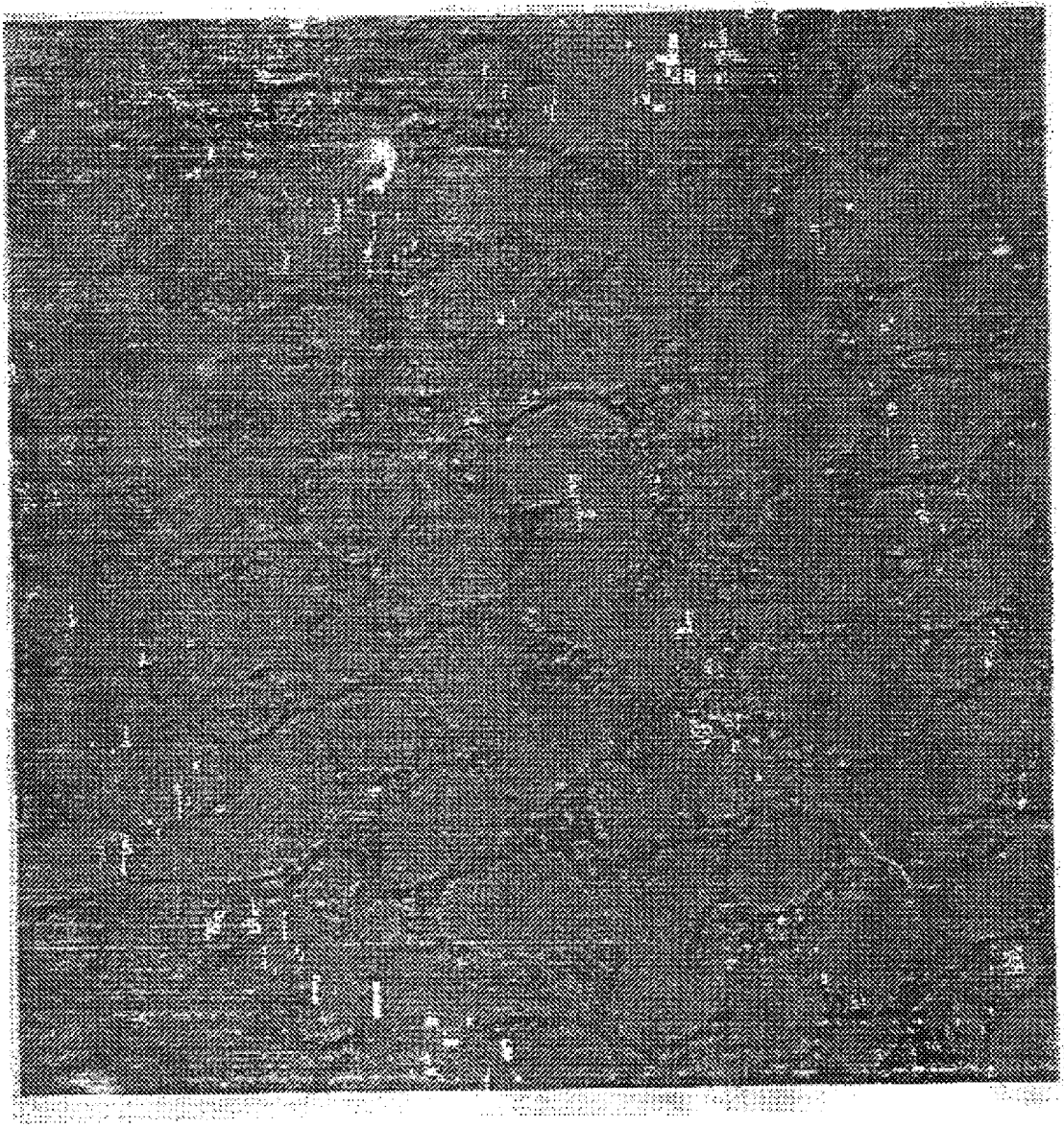
Figure 2.2

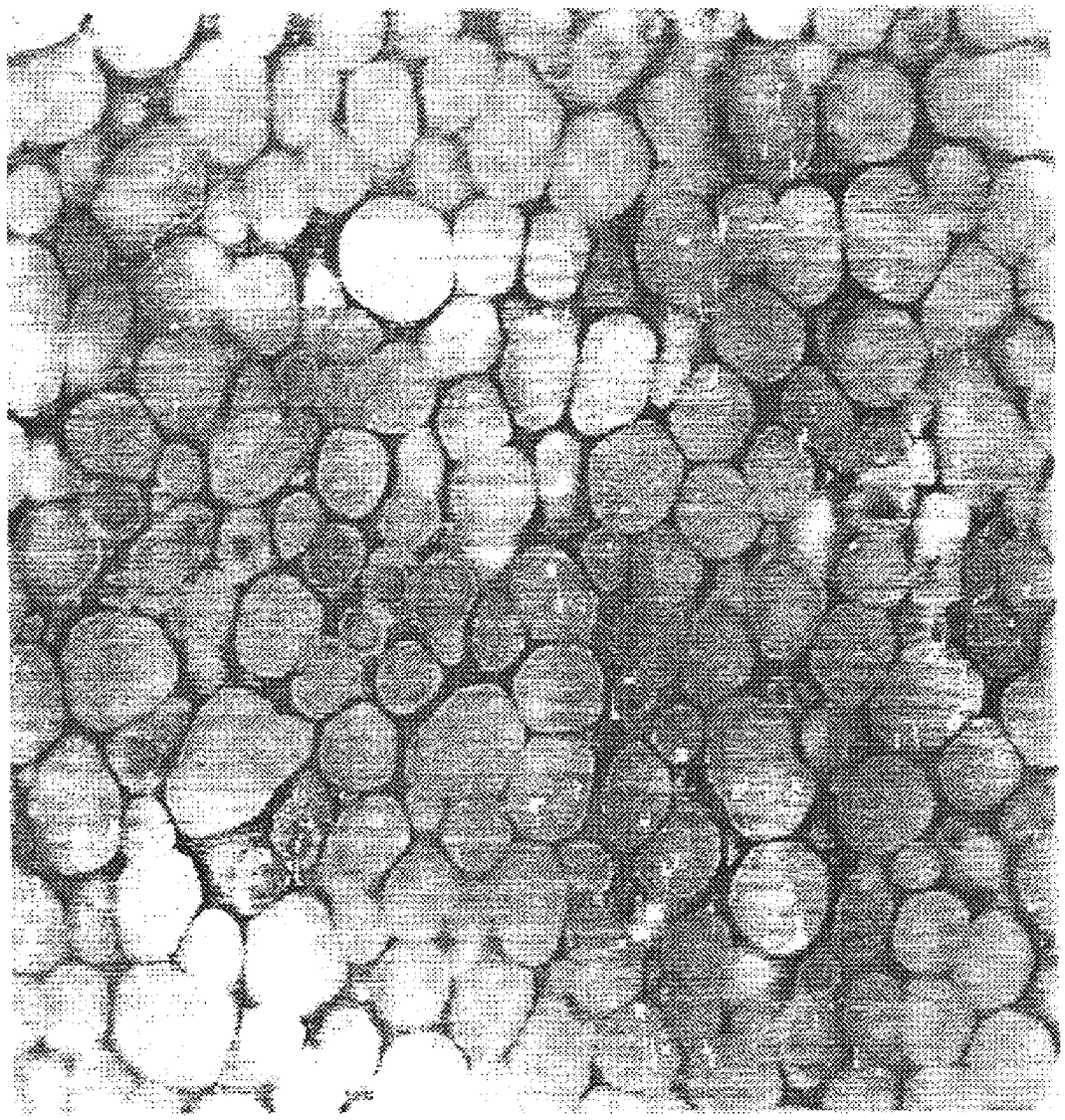
Figure 2.3

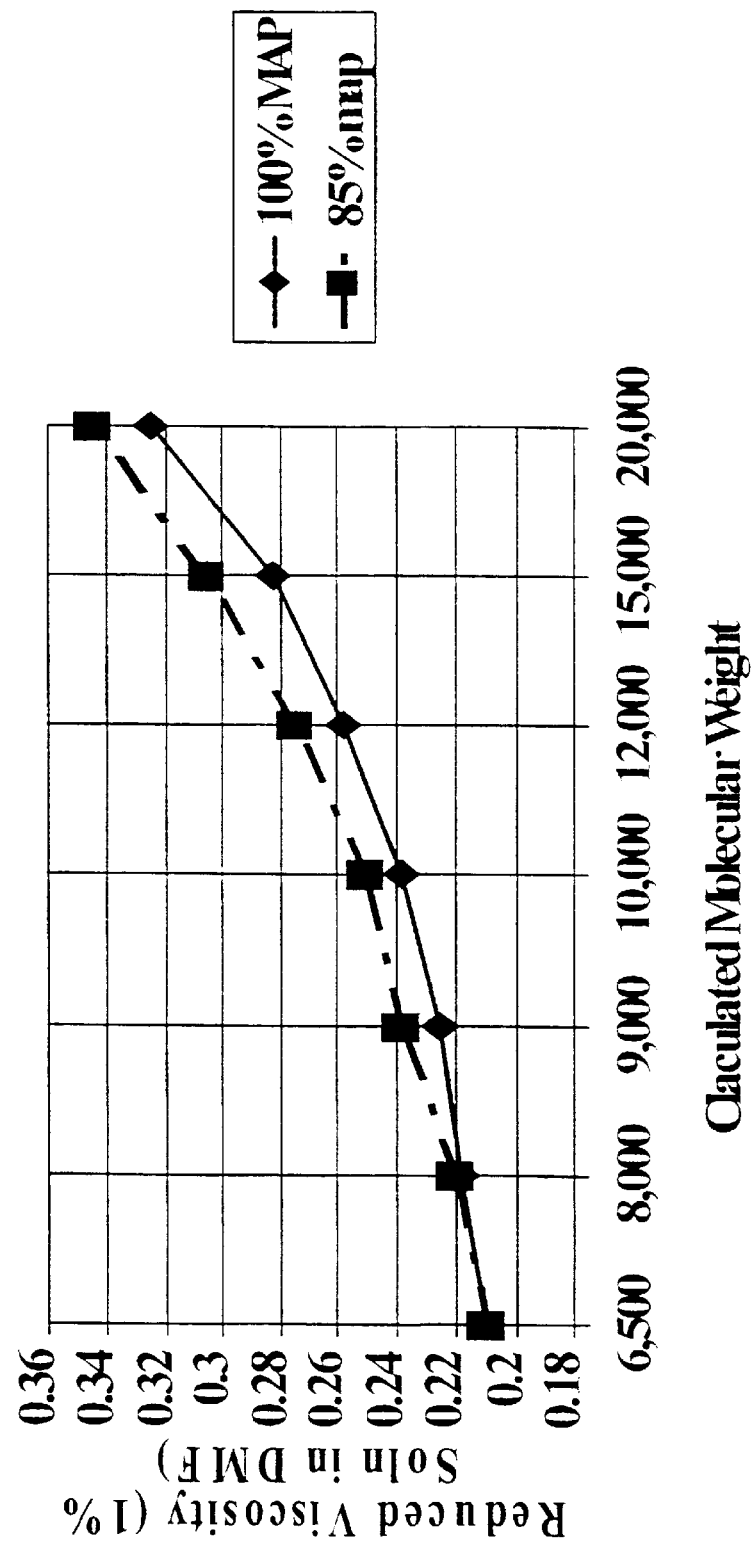
Figure 3.1

Figure 3.2
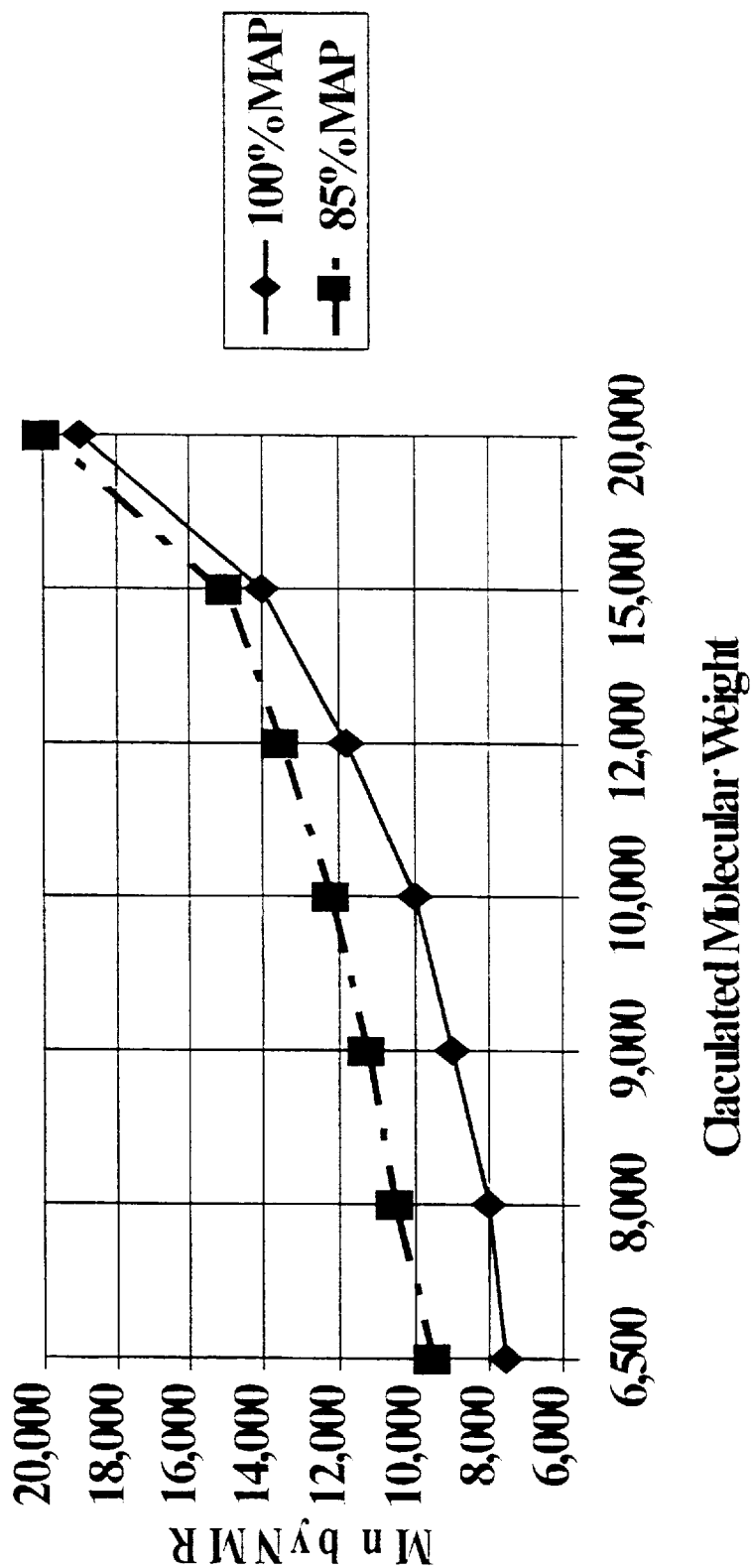
A Plot of Calculated Molecular Weight as a Function of Mn as Determined by NMR

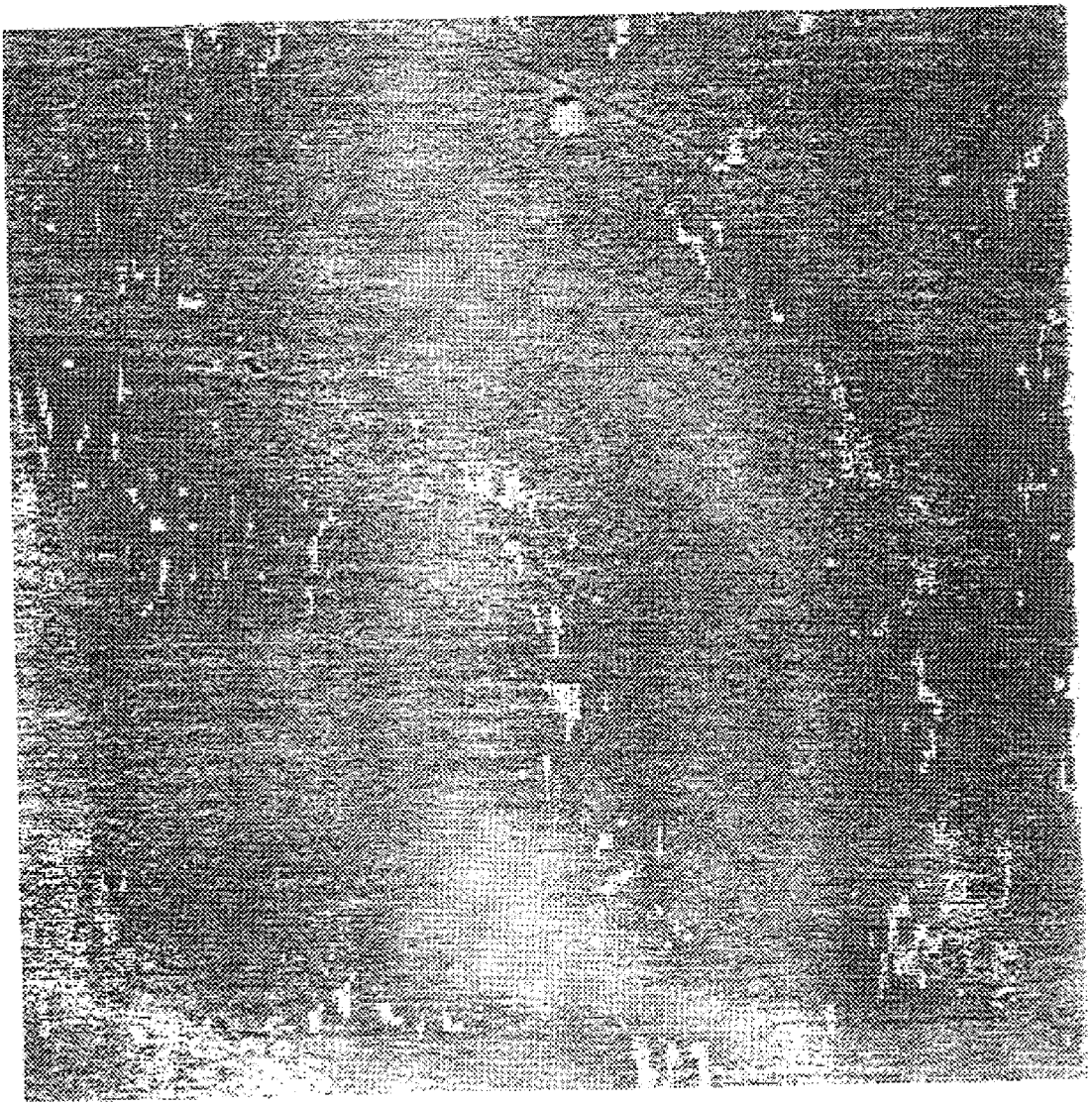
Figure 3.3

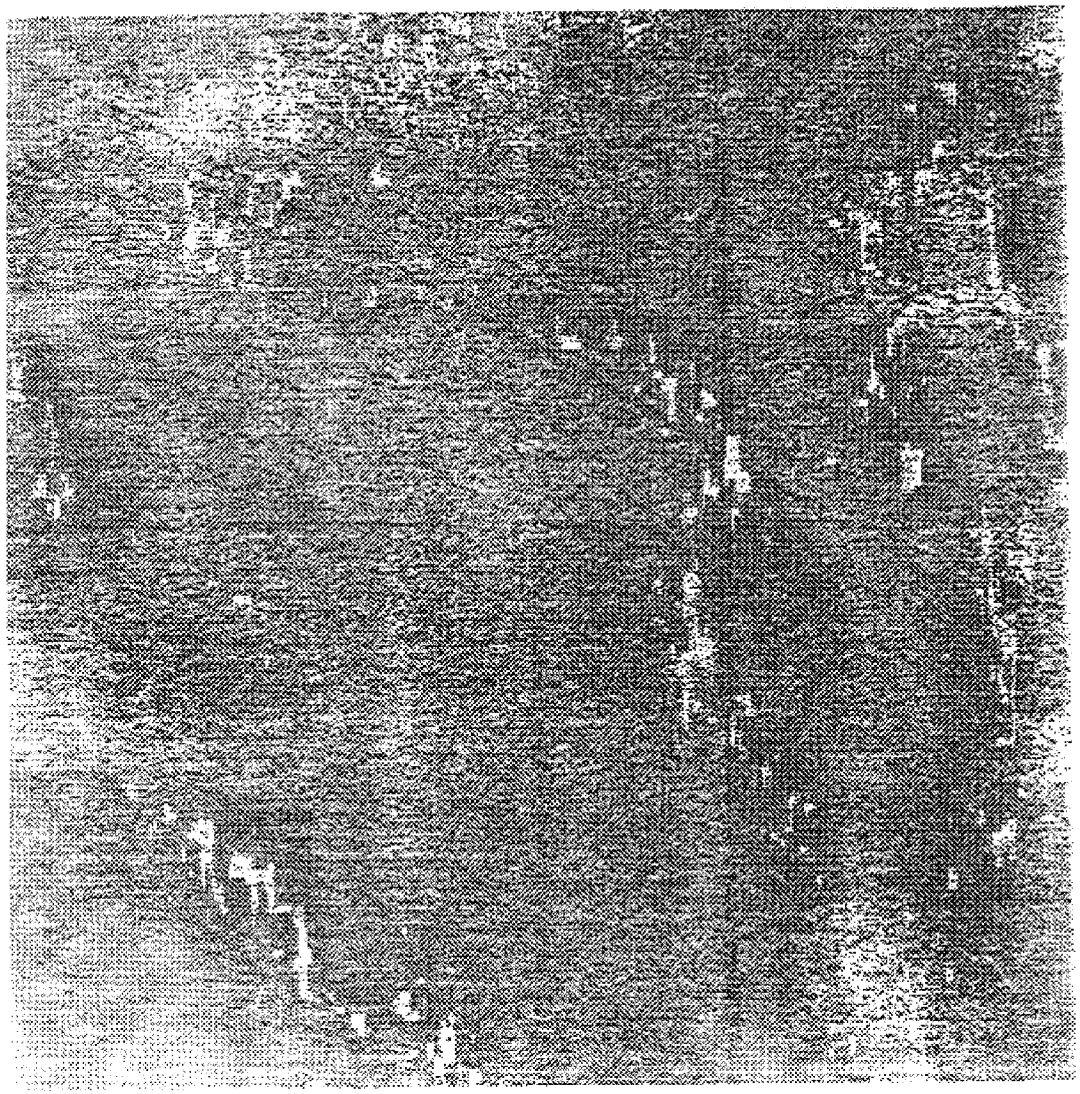
Figure 3.4

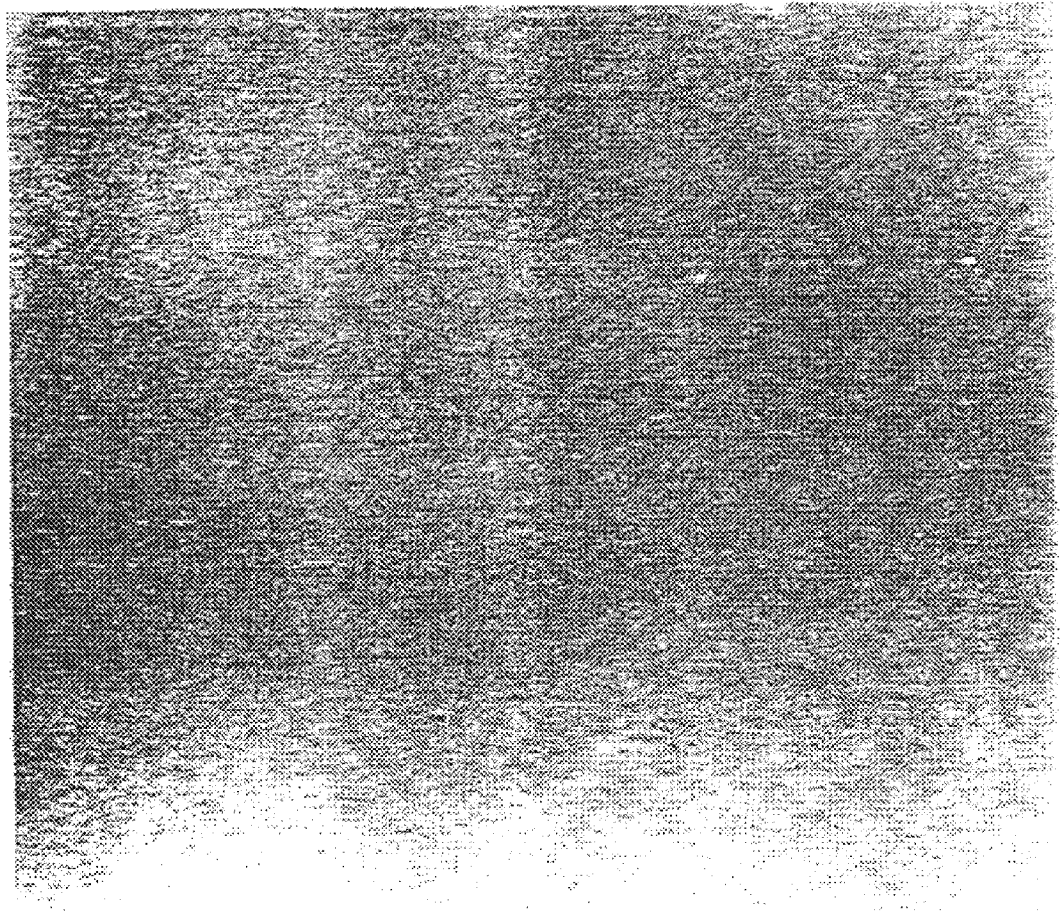
Figure 3.5

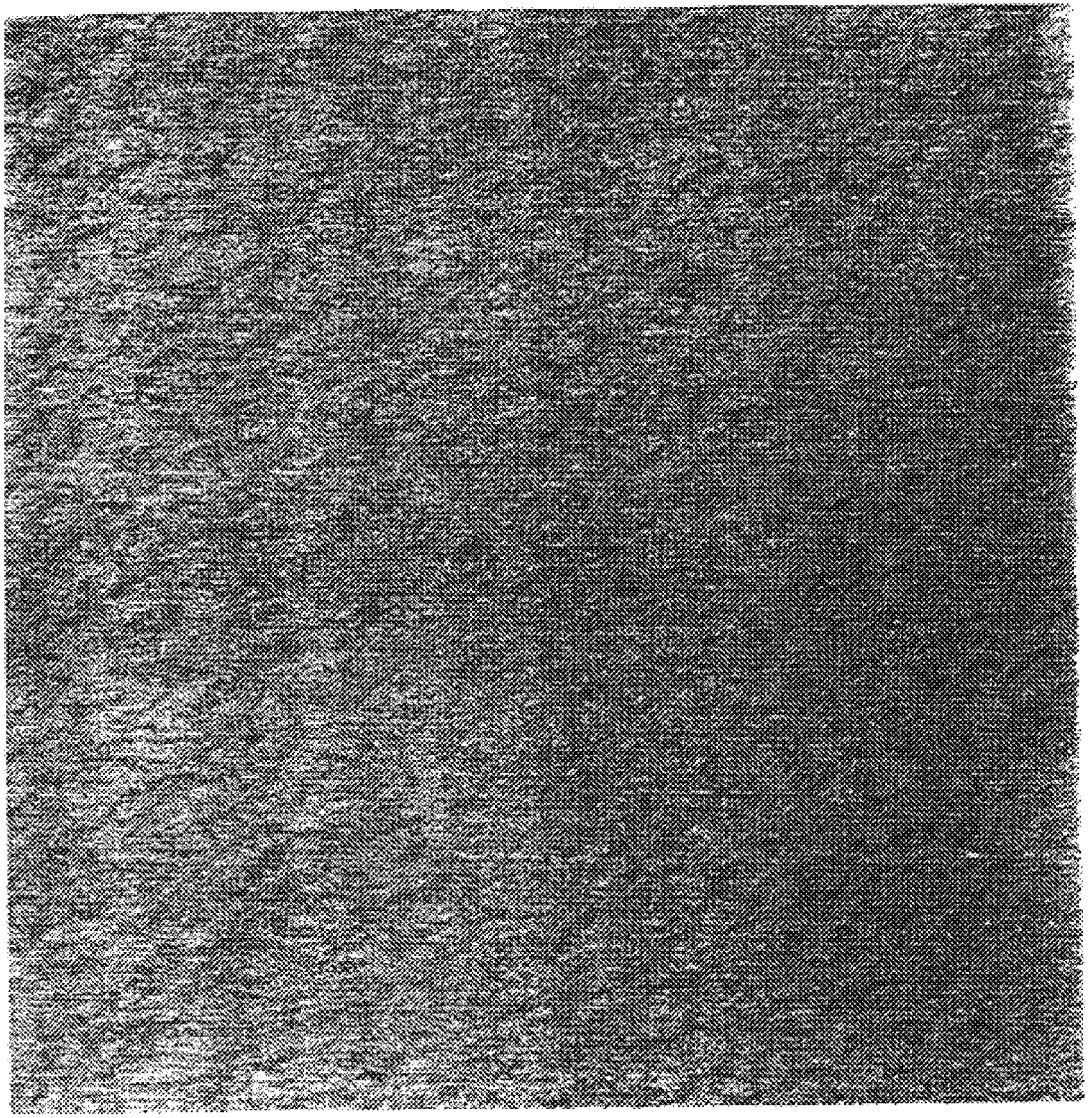
Figure 3.6

PROCESS FOR PREPARING POLYARLETHERS

This application is a continuation of PCT/GB99/00540 filed Feb. 22, 1999.

PROCESS FOR PREPARING POLYMERS

The present invention relates to a process for the preparation of polymer compositions, the polymer compositions obtained by the process of the invention, method for the manufacture of composites, prepregs and the shaped articles employing the polymer compositions obtained with the process of the invention; and the manufactured products thereof. Specifically the present invention relates to a process for the preparation of polyaromatic compositions of desired molecular weight range, the compositions obtained by the process, a method for the manufacture of composites, prepregs and shaped articles with use of the compositions, and manufactured products thereof.

The use of curable compositions such as epoxy, cyanate, phenolic and like resins, both reinforced and unreinforced has been known for a long time in a wide variety of structural commercial and military applications. Sports devices, building materials, aeronautical, land and nautical vehicles have all found light weight carbon-based touch materials give enhanced performance.

More recently, classes of polyaromatic compositions comprising polyaryl thermoplastic components containing ether- and/or thioether-linked repeating units in the form of polyether aromatics and polyetherether aromatics are known for the manufacture of engineering polymers and composites having unique properties for the above structural applications in terms of strength, fracture toughness and high temperature stability and resistance.

Processes for the preparation of polyaromatics are known in "Polyaromatics", P. T. McGrail. Polymer International 41 (1996) 103–121, polyaromatics and their synthesis are reviewed. The polymers are traditionally manufactured by nucleophilic processes for the condensation of alkali metal salts of monomers with elimination of water.

The review details the synthesis of the known Victrex PES and PEEK polymers comprising repeating polyether sulphone and ketone units which are prepared from bisphenol-S and hydroquinone with a halogenated monomer, traditionally by a process which enables the manufacture in high molecular weight. The process entails heating together alkali metal salts of monomers in diphenyl sulphone (DPS), a solvent which is solid from room temperature. Water produced as a by product of reaction is eliminated at the elevated reaction temperatures employed. Since DPS is a solid at room temperature up to about 150° C., it is not possible to precipitate the product polymer into a non-solvent at non-extreme temperatures. The solid which is formed on cooling which comprises a mixture of the desired polymer, DPS and residual salts, must be ground to a fine powder and put through a complex production cycle to remove the residual DPS and salts by leaching out. Finally, the polymer is dried.

A very accurate control of stoichiometry and polymerisation conditions is required in order to avoid leaching out polymer composition together with residual DPS and salts. This means that the molecular weight of polymer composition must be sufficiently high to give minimum solubility in extractant. This further complicates subsequent stages of injection molding, impregnating and the like by virtue of the high relative viscosity of the high molecular weight polymer components of the polymer composition, requiring processing at elevated temperatures.

The review also details the synthesis of a class of polysulphones which are prepared from bisphenol-A and DCDPS. This process traditionally entails heating together alkali metal salts of monomers in sulphoxide or sulphone, preferably dimethylsulphoxide (DMSO) under anhydrous conditions. In order to conduct the polymerisation reaction under anhydrous conditions it is necessary to form the alkali metal salts of monomers in a first stage in presence of an azeotrope, with removal of water prior to commencing the second stage polymerisation. The process is typically carried out at a limited maximum reaction temperature and even with use of highly reactive precursors it is not possible to develop high molecular weight. Moreover the process is cumbersome and costly due to the two stage nature, requiring intermediate processing for water removal, and due to the presence of azeotrope in both stages requiring isolation and processing of product polymer with non aqueous media.

Accordingly a first object of the present invention is to provide a process for preparation of polyaromatic compositions in which polymer reaction and isolation may be conducted independently, of constraints imposed by reaction components and for the removal of by-products of reaction.

A second object of the present invention is to provide a process for the preparation of polyaromatic compositions with use of an effective fluid combination enabling effective isolation of the product composition in convenient form.

A third object of the present invention is to provide a process for the preparation of polyaromatic compositions in a calculated molecular weight range of polymer which may be achieved independently of constraints imposed by the process such as solubility constraints and the like.

A fourth object of the present invention is to provide high quality injection molded, impregnated or otherwise shaped articles obtained with improved processing advantages of polymer compositions of the invention.

We have now surprisingly found that the above objects can be met in admirable manner with use of a novel process for the preparation of polyaromatic compositions.

Accordingly in its broadest aspect there is provided according to the present invention a process for the preparation of a polymer composition comprising at least one aromatic or a mixture thereof, the process comprising:

i) obtaining a reaction mixture comprising polymer precursors in a first fluid boiling in excess of 100° C.;

ii) subjecting the reaction mixture to a first elevated temperature in excess of 100° C. to generate the alkali metal salts of polymer precursors and the polymer reaction products thereof; and iii) subjecting the reaction product mixture to at least a second temperature and isolating the reaction product in the form of a polymer composition which is substantially insoluble in a second fluid, from the first fluid which is substantially soluble in the second fluid, by contacting with an amount of second fluid:

wherein the process is conducted in substantial absence of an effective amount of an azeotrope.

It is a particular advantage that the process of the present invention can be carried out as an integrated single stage process. This is partially attributable to the fact that the process is self regulating or may be regulated in terms of production of volatiles in manner which is compatible with the progress of the reaction and with the reaction components themselves.

It is a further advantage of the process of the present invention that processing and isolation are integrated in manner that neither imposes constraints on the other in terms of incompatibility of components and conditions, but rather that features of processing and isolation are adapted for mutual enhancement in terms of convenience and efficiency.

Reference herein to first and second fluid is to an substance or mixtures of substances which is liquid at the first and second reaction and isolation temperatures.

Preferably the composition is soluble to less than 20% in the second fluid, more preferable to less than 10%, for example 0 to 5%. Preferably the first fluid is soluble to more than 50% in the second fluid, more preferably more than 80%, for example 85–100%.

It has surprisingly been found that the process of the invention eliminates constraints on choice of solvents such that the polymer composition may be isolated by precipitation in convenient manner as hereinbefore defined.

The first fluid suitably comprises at least one dipolar aprotic solvent which acts to promote the polymerisation reaction. Preferable, the first fluid boiling in excess of 100° C. is selected from one or more of sulphur oxides, such as sulphoxides and sulphones, formamides, pyrrolidones, cyclic ketones and the like, for example tetramethylenesulphone (sulpholane) of formula $(CH_2)_4S(O)_2$, dimethylsulphoxide (DMSO) of formula $(CH_3)_2SO$, diphenylsulfone (DPS) of formula $(C_6H_5)_2SO$, dimethylformamide (DMF), dimethylacetamide (DMAC), n-methyl pyrrolidone (NMP) of formula $C_4H_8NCH_3$ and cyclopentanone. A first fluid which is in the liquid phase at first and second temperatures as hereinbefore defined may nevertheless comprise a fluid mixture, of which any one or a number of components for example DPS, is not in the liquid phase at the temperatures as defined. Preferably the solvent is selected according to the reactivity of the monomers to be employed and according to the desired reaction temperature to be employed, for example the solvent boils in the range 100–200° C. for use with highly reactive monomers or boils in excess of 200° C. for use with less reactive monomers.

In a further advantage of the present invention it has been found that the polymers of the invention are more favourably soluble in the hereinbefore defined first fluids, whereby the process may be conducted in high concentration and/or with optimum time-temperature profiling. This results in significant processing cost savings.

Moreover, the process of the present invention is highly reproducible in terms of chemical and physical polymer properties including molecular weight range and distribution. This renders the polymer compositions particularly useful for applications imposing critical performance requirements on the polymers employed.

Preferably the second fluid is any fluid displaying the required solvent properties, for example is selected from alcohols and demineralised water or demineralised aqueous solvents and mixtures thereof. More preferably a second fluid as hereinbefore defined boils in the range 50–150° C., most preferably 50–110° C., and comprises water, an aqueous solvent or $C_{1-3}$ alcohol, most preferably is water or methanol. It is a particular advantage that the first and second fluid boiling range are adapted for recovery of first and/or second fluids in high purity for reuse or disposal.

Prior to isolation of product, it may be desired to filter or otherwise purify, the reaction solution for the removal of any solid contaminants such as alkali metal reaction products. Preferably the purified reaction solution contains less than 1000 ppm of KCl, more preferably less than 500 ppm, most preferably less than 200 ppm, for example in the range 10–150 ppm. It is a particular advantage of the present invention that solution isolation enables purification by this means, rendering the product polymers suitable for applications which are not compatible with presence of alkali metal ions. Moreover purification enables rapid and cost effective recovers of polymers.

In a preferred embodiment of the present invention isolation is carried out by reducing the reaction mixture to a temperature in the range 90–125° C. and contacting with a second fluid as hereinbefore defined which boils in the range 50–110° C. Contacting with second fluid may be conducted in manner that the aggregate temperature after contacting of the second fluid is sufficiently, low as to prevent substantial loss of second fluid by evaporation, and sufficiently high as to prevent non-simultaneous phase transition.

The process of the present invention may be employed for the synthesis and isolation of amorphous or semi-crystalline polymers or mixtures thereof.

Preferably the at least one polyaromatic comprises repeating units of the formula

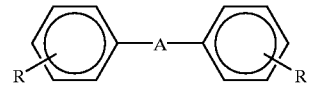

wherein A is a direct link, oxygen, sulphur, —CO— or a divalent hydrocarbon radical;

R is any one or more substituents of the aromatic rings, each independently selected from hydrogen, $C_{1-8}$ branched or straight chain aliphatic saturated or unsaturated aliphatic groups or moieties optionally comprising one or more heteroatoms selected from O, S, N, or halo for example Cl or F; and groups providing active hydrogen especially OH, $NH_2$, NHR— or —SH, where R— is a hydrocarbon group containing up to eight carbon atoms, or providing other cross-linking activity especially epoxy, (meth)acrylate, cyanate, isocyanate, acetylene or ethylene, as in vinyl, allyl or maleimide, anhydride, oxazoline and monomers containing saturation; and wherein said at least one polyaromatic comprises reactive pendant and/or end groups.

More preferably the at least one polyaromatic comprises at least one polyaryl sulphone comprising ether-linked repeating units, optionally additionally comprising thioether-linked repeating units, the units being selected from the group consisting of

—$(PhSO_2Ph)_n$— and optionally additionally

—$(Ph)_a$— wherein Ph is phenylene, n=1 to 2 and can be fractional, a=1 to 3 and can be fractional and when a exceeds 1, said phenylenes are linked linearly through a single chemical bond or a divalent group other than —$SO_2$— or are fused together, provided that the repeating unit —$(PhSO_2Ph)_n$— is always present in said at least one polyarylsulphone in such a proportion that on average at least two of said units —$(PhSO_2Ph)_n$— are in sequence in each polymer chain present, said at least one polyarylsulphone having reactive pendant and/or end groups.

Preferably the polyaromatic comprises polyether sulphone, more preferably a combination of polyether sulphone and of polyether ether sulphone linked repeating units, in which the phenylene group is meta- or para- and is preferably para and wherein the phenylenes are linked linearly through a single chemical bond or a divalent group other than sulphone, or are fused together. By "fractional" reference is made to the average value for a given polymer chain containing units having various values of n or a.

Additionally, as also discussed, in said at least one polyarylsulphone, the relative proportions of the said repeating units is such that on average at least two units $(PhSO_2Ph)_n$ are in immediate mutual succession in each polymer chain present and is preferably in the range 1:99 to 99:1, especially 10:90 to 90:10. respectively. Typically the ratio is in the range 25–50 $(Ph)_2$, balance $(PhSO_2Ph)_n$. In preferred polyarylsulphones the units are:

1 X $PhSO_2PhXPhSO_2Ph$ ("PES") and

11 $X(Ph)_2$ $XPhSO_2Ph$ ("PES")

where X is O or S and may differ from unit to unit; the ratio is 1 to 11 (respectively) preferably between 10:90 and 80:20 especially between 10:90 and 55:45.

The preferred relative proportions of the repeating units of the polyarylsulphone may be expressed in terms of the weight percent $SO_2$ content, defined as 100 times (weight of $SO_2$)/(weight of average repeat unit). The preferred $SO_2$ content is at least 22, preferably 23 to 25%. When a=1 this corresponds to PES:PEES ratio of at least 20:80. preferably in the range 35:65 to 65:35.

The above proportions refer only to the units mentioned. In addition to such units the polyarylsulphone may contain up to 50 especially up to 25% molar of other repeat units: the preferred $SO_2$ content ranges (if used) then apply to the whole polymer. Such units may be for example of the formula

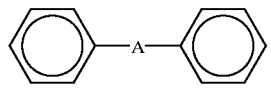

as hereinbefore defined in which A is a direct link, oxygen, sulphur, —CO— or a divalent hydrocarbon radical. When the polyarylsulphone is the product of nucleophilic synthesis, its units may have been derived for example from one or more bisphenols and/or corresponding bisthiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl)propane and -methane.

If a bis-thiol is used, it may be formed in situ, that is, a dihalide as described for example below may be reacted with an alkali sulphide or polysulphide or thiosulphate.

Other examples of such additional units are of the formula

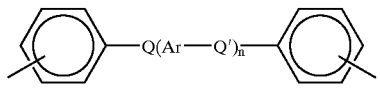

in which Q and Q', which may be the same or different, are CO or SO2; Ar is a dialent aromatic radical: and n is 0, 1, 2, or 3, provided that n is not zero where Q is SO2. Ar is preferably at least one divalent aromatic radical selected from phenylene, biphenylene or terphenylene. Particular units have the formula

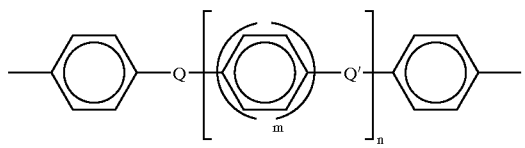

where m is 1, 2 or 3. When the polymer is the product of nucleophilic synthesis, such units may have been derived from one or more dihalides, for example selected from 4,4'-dihalobenzophenone, 4,4'bis(4-chlorophenylsulphonyl) biphenyl, 1,4,bis(4-halobenzoyl)bezene and 4,4'-bis(4-halobenzoyl)biphenyl.

They may of course have been derived partly from the corresponding bisphenols.

The polyaromatic may be the product of nucleophilic synthesis from halophenols and/or halothiophenols. In any nucleophilic synthesis the halogen if chlorine or bromine may be activated by the presence of a copper catalyst.

Such activation is often unnecessary if the halogen is activated by an electron withdrawing group. In any event fluoride is usually more active than chloride. Any nucleophilic synthesis of the polyaromatic is carried out preferably in the presence of one or more alkali metal salts, such as KOH, NaOH or $K_2CO_3$ in up to 10% molar excess over the stoichiometric.

As previously mentioned, said at least one polyaromatic contains reactive end groups and/or pendant groups. End groups may be obtained by a reaction of monomers or by subsequent conversion of product polymers prior to or subsequently to isolation. Preferably groups are of formula —A'—Y where A' is a divalent hydrocarbon group, preferably aromatic, and is a group reactive with epoxide groups or with curing agent or with like groups on other polymer molecules. Examples of Y are groups providing active hydrogen especially OH, $NH_2$,NHR' or —SH, where R' is a hydrocarbon group containing up to 8 carbon atoms, or providing other cross-linking reactivity especially epoxy, (meth)acrylate, cyanate, isocyanate, acetylene or ethylene, as in vinyl, allyl or maleimide, anhydride, oxazaline and monomers containing saturation.

The number average molecular weight of the polyaromatic is suitably in the range 2000 to 60000. A useful sub-range is over 9000 especially over 10000 for example 11000 to 25000, or is under 9000, especially in the range of 3000 to 11000, for example 3000 to 9000, and structurally as well as by chemical interaction increases toughness by comparison with that of the thermoset resin alone by providing zones of the tough thermoplast between cross-linked thermoset zones.

The polyaromatic prepared according to the process of the invention may be further combined with additional polymers, for example, thermoset polymers as hereinbefore described. Thermoset polymers may be selected from the group consisting of an epoxy resin, an addition-polymerisation resin, especially a bis-maleimide resin, a formaldehyde condensate resin, especially a formaldehyde-phenol resin, a cyanate resin, an isocyanate resin, a phenolic resin and mixtures of two or more thereof, and is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof, a cyanate ester resin or a phenolic resin. Examples of addition-polymerisation resins are acrylics, vinyls, bis-maleimides, and unsaturated polyesters. Examples of formaldehyde condensate resins are urea, melamine and phenols.

Preferably the thermoset polymer comprises at least one epoxy, cyanate ester or phenolic resin precursor, which is liquid at ambient temperature for example as disclosed in EP-A-0 311 349. EP-A-0 365 168, EPA 91310167.1 or in PCT/GB95/01303.

An epoxy resin may be selected from N,N,N',N'-tetraglycidyl diamino diphenylmethane (eg "MY 9663", "MY 720" or "MY 721" sold by Ciba-Geigy) viscosity 10–20 Pa s at 50° C.; (MY 721 is a lower viscosity version of MY720 and is designed for higher use temperatures); N,N,N',N'-tetraglycidyl-bis(4-aminophenyl)-1,4-diisopropylbenzene (eg Epon 1071 sold by Shell Chemical Co) viscosity 18–22 Poise at 110° C.; N,N,N',N'-tetraclycidyl-bis(4-amino-3,5-dimethylphenyl)-1,4-diisopropylbenzene, (eg Epon 1072 sold by Shell Chemical Co) viscosity 30–40 Poise at 110° C.; triglycidyl ethers of p-aminophenol (eg "MY 0510" sold by Ciba-Geigy), viscosity 0.55–0.85 Pa s at 25° C.; preferably of viscosity 8–20 Pa at 25° C.; preferably this constitutes at least 25% of the epoxy components used; diglycidyl ethers of bisphenol A based materials such as 2,2-bis(4,4'-dihydroxy phenyl) propane (eg "DE R 661" sold by Dow, or "Epikote 828" sold by Shell), and Novolak resins preferably of viscosity 8–20 Pa s at 25° C.; glycidyl ethers of phenol Novolak resins (eg "DEN 431" or "DEN 438" sold by Dow), varieties in the low viscosity class of which are preferred in making compositions according to the invention; diglycidyl 1,2-phthalate, eg GLY CEL A-100; diglycidyl derivative of dihydroxy diphenyl methane (Bisphenol F) (eg "PY 306" sold by Ciba Geigy) which is in the low viscosity class. Other epoxy resin precursors include cycloaliphatics such as 3',4'-epoxycyclohexyl-3,4-epoxycyclohexane carboxylate (eg "CY 179" sold be Ciba Geigy) and those in the "Bakelite" range of Union Carbide Corporation.

A cyanate ester resin may be selected from one or more compounds of the central formula NCOAr(Y$_x$Ar$_m$)$_q$OCN and oligomers and/or polycyanate esters and combinations thereof wherein Ar is a single or fused aromatic or substituted aromatics and combinations thereof and therebetween nucleus linked in the ortho, meta and/or para position and x=0 up to 2 and m and q=0 to 5 independently. The Y is a linking unit selected from the group consisting of oxygen, carbonyl, sulphur, sulphur oxides, chemical bond, aromatic linked in ortho, meta and/or para positions and/or CR$_3$R$_2$ wherein R$_1$ and R$_2$ are hydrogen, halogenated alkanes, such as the fluorinated alkanes and/or substituted aromatics and/or hydrocarbon units wherein said hydrocarbon units are singularly or multiply linked and consist of up to 20 carbon atoms for each R$_1$ and/or R$_2$ and P(R$_3$R$_4$R'$_4$R$_5$) wherein R$_3$ is alkyl, aryl, alkoxy or hydroxy, R'$_4$ may be equal to R$_4$ and a singly linked oxygen or chemical bond and R$_5$ is doubly linked oxygen or chemical bond or Si(R$_3$R$_4$R'$_4$R$_6$) wherein R$_3$ and R$_4$, R'$_4$ are defined as in P(R$_3$R$_4$R'$_4$R$_5$) above and R$_5$ is defined similar to R$_3$ above. Optionally, the thermoset can consist essentially of cyanate esters of phenol/formaldehyde derived Novolaks or dicyclopentadiene derivatives thereof, an example of which is XU71787 sold by the Dow Chemical Company.

A phenolic resin may be selected from any aldehyde condensate resins derived from aldehydes such as methanal, ethanal, benzaldehyde or furfuraldehyde and phenols such as phenol, cresols, dihydric phenols, chlorphenols and C$_{1-9}$ alkyl phenols, such as phenol, 3- and 4-cresol(1-methyl, 3- and 4-hydroxy benzene), catechol(2-hydroxy phenol), resorcinol(1,3-dihydroxy benzene) and quinol(1,4-dihydroxy benzene). Preferably phenolic resins comprise cresol and novolak phenols.

The thermoset polymer is suitably the product of at least partly curing a resin precursor using a curing agent and optionally a catalyst.

The weight proportion of thermoplast component in the composition is typically in the range 5 to 100%, preferably 5 to 90%, especially 5 to 50, for example 5 to 40%.

The thermoset and polyarylaromatic are suitably reacted in the presence of a curing agent to provide a resin composition. The curing agent is suitably selected from any known curing agents, for example as disclosed in EP-A-0 311 349. EPA 91310167.1. EP-A-0 365 168 or in PCT/GB95/01303, which are incorporated herein by reference, such as an amino compound having a molecular weight up to 500 per amino group, for example an aromatic amine or a guanidine derivative. Particular examples are 3,3'- and 4,4'-diaminodiphenylsulphone, (available as "DDS" from commercial sources), methylenedianiline, bis(4amino-3,5-dimethylphenyl)-1,4-diisopropylbenzene (available as EPON 1062 from Shell Chemical Co); bis(4-aminophenyl)-1,4-diisopropylbenzene (available as EPON 1061 from Shell Chemical Co); 4-chlorophenyl-N,N-dimethyl-urea, eg Monuron; 3,4-dichlorophenyl-N,N-dimethyl-urea, eg Diuron and dicyanodiamide (available as "Amicure CG 1200 from Pacific Anchor Chemical). Other standard epoxy curing agents such as aliphatic diamines, amides, carboxylic acid anhydrides, carboxylic acids and phenols can be used if desired. If a novolak phenolic resin is used as the main thermoset component a formaldehyde Generator such as hexamethylenetetraamine (HMT) is typically used as a curing agent.

Conventionally, and as described in EP-A-0 311 349 or in PCT/GB95/01303, a catalyst for the epoxy resin component curing agent reaction may also be used, typically a Lewis acid or a base.

The process of the invention is carried out using polymer precursors as hereinbefore defined. Specifically the precursors comprise one or more dihalides as hereinbefore defined, one or more bisphenols as hereinbefore defined as repeating units, in addition to a substituted monophenol in which the substituent is a reactive group Y as hereinbefore defined adapted to end cap the polymer chains and an alkali metal salt, as hereinbefore defined which serves to ensure formation of bisphenates by elimination of water from bisphenols. The precursors providing repeating units are suitably provided in a first fluid as hereinbefore defined and degassed. The alkali metal salt, preferably potassium carbonate is suitably added to the reaction mixture which is subjected to at least a first elevated temperature in excess of 100° C. for extended periods as desired in order to allow the salts of monomers to form and react. Preferably the reaction mixture is subjected to at least a first elevated temperature in successive ranges, for example in a first range for a first period, a second range in excess of the first for a second period and a third range in excess of the first and second for a further period. For lower reactivity monomers for example, the first elevated temperatures is suitably of the order 150–250° C. preferably in successive ranges of 150–200° C., 180–220° C., and 200–250° C. respectively, each being maintained for a period of up to 5 hours, for example of 10–60 minutes, preferably 20–50 minutes for the first and second periods and in excess of 3 hours for the third period.

It should be appreciated that any time-temperature profile may be employed which provides for reaction of the precursors as hereinbefore defined. It is a particular advantage that a profile as hereinbefore defined may be employed to provide excellent process control and end group control leading to desired molecular weight distribution.

The relative amounts of precursors may be selected according to the desired polymer composition. A composition comprising polyethersulphones to polyetherethersulphones in a desired ratio may therefore be obtained by employing respective proportions of bisphenol and dihalides to monophenol in the same molar amounts. Preferably the proportion of bisphenol and dihalide to monophenol is in the range of 10:90–100:0, preferably 30:70–70:30, providing the polyarylsulphone having PES:PEES of the same proportions. The reaction of precursors is allowed to proceed for a further period at elevated temperature to a desired range of polymer molecular weight. Reaction may be deemed complete after sufficient time to allow all polymer precursors to react, including a proportion of end-capping component which is introduced at the outset or during the course of the reaction or prior to isolation.

Preferably end-capping component is introduced at the outset with the polymer precursors. This has the advantage of avoiding the need to open up the reactor at a later quenching stage, which risks disturbing the reaction and introducing gaseous contaminants such as oxygen and the like. Moreover without being limited to this theory it is thought that the presence of end capping component throughout the process may lead to controlled and stable polymer chain growth which is as a result of self regulation of chain length. Such self regulation may take the form of continuous growth of chains with simultaneous chain scission by end capping components.

Alternatively end capping component may be added in a further amount of first fluid to the reacted polymer components at a further elevated temperature for a further period. This has the advantage of quenching the reaction mixture to halt the further development of molecular weight. Preferably the further elevated end-capping, or quench temperature is in the range of 200–250° C. for a period of 30–90 minutes.

End-capping component may be the same as or different to a polymer precursor as hereinbefore defined. End caps comprising halo or hydroxy reactive groups may be obtained by addition of an excess of a component as hereinbefore defined providing the repeating units of the polyarylsulphone, for example employing a slight molar excess of the dihalide or the bisphenol and monophenol. This has the advantage of convenience and accuracy of handling the minimum number of components. Alternatively end-caps comprising amino reactive groups may be obtained by addition of a pre-determined amount of a monomer, which does not provide repeating units of the polyarylsulphone, for example of aminophenol. This has the advantage of dedicated control of end-capping stoichiometry and molecular weight development. The composition is isolated in the form of a solid phase precipitate which may be purified and dried as hereinbefore defined and according to known techniques.

The composition obtained by the process of the invention may be further converted to derivatives or analogues of the polyaromatic by reaction with a suitable functionalising or derivatising agent. For example the end caps may be modified by providing the composition in the reaction solution, or post-isolation, in a solution of a suitable solvent together with any functionalising or derivatising agent according to known techniques. Alternatively the composition may be provided in solution of a suitable solvent together with further polymers to provide curable composites according to known techniques.

In a further aspect of the invention there is provided a polymer composition obtained with the process of the present invention as hereinbefore defined.

In a further aspect of the invention there is provided the use of a first or second fluid as hereinbefore defined, in the preparation of a polymer composition as hereinbefore defined.

In a further aspect there is provided according to the invention novel intermediates of the process for the preparation of a polymer composition as hereinbefore defined.

In a further aspect there is provided according to the invention a resin formulation comprising a polyaromatic component and an additional polymer as hereinbefore defined.

In a further aspect of the invention there is provided a method for the manufacture of composites employing the compositions obtained with the process of the invention.

A resin composition is particularly suitable for fabrication of structures. including load-bearing or impact resisting structures. For this purpose it may contain a reinforcing agent such as fibres. Fibres can be added short or chopped typically of mean fibre length not more than 2 cm, for example about 6 mm. Alternatively, and preferably, the fibres are continuous and may, for example, be unidirectionally-disposed fibres or a woven fabric, ie the composite material comprises a prepreg. Combinations of both short and/or chopped fibres and continuous fibres may be utilised. The fibres may be sized or unsized. Fibres can be added typically at a concentration of 5 to 35, preferably at least 20%, by weight. For structural applications, it is preferred to use continuous fibre for example glass or carbon, especially at 30 to 70, more especially 50 to 70% by volume.

The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7.

Organic or carbon fibre is preferably unsized or is sized with a material that is compatible with the composition according to the invention, in the sense of being soluble in the liquid precursor composition without adverse reaction or of bonding both to the fibre and to the thermoset thermoplastic composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition; examples are the organo-silane coupling agents applied to glass fibre.

The composition may contain for example conventional toughening agents such as liquid rubbers having reactive groups, aggregates such as glass beads, rubber particles and rubber-coated glass beads, filler such as polytetrafluoroethylene, silica, graphite, boron nitride, mica, talc and vermiculite, pigments, nucleating agents, and stabilisers such as phosphates. The total of such materials and any fibrous reinforcing agent in the composition should be at least 20% by volume, as a percentage of the total volume of the polysulphone/thermoset mixture. The percentages of fibres and such other materials are calculated on the total composition after curing at the hereinbelow defined temperatures.

Preferably the composition is used in the form of a curable resin composition as hereinbefore defined, made by mixing the polyaromatic, thermoset precursor and (at some stage) any fibrous reinforcing agent and other materials. A solvent may be present. The solvent and the proportion thereof are chosen so that the mixture of polymer and resin precursor form at least a stable emulsion, preferably a stable apparently single-phase solution. The ratio of solvent to polysulphone is suitably in the range 5:1 to 20:1 by weight. Preferably a mixture of solvents is used, for example of a halogenated hydrocarbon and an alcohol, in a ratio suitably in the range 99:1 to 85:15. Conveniently the solvents in such a mixture should boil at under 100° C. at 1 atm pressure and should be mutually miscible in the proportions used. Alternatively the polyaromatic and thermoset or precursor can be brought together by hot melting and/or high shear The mixture is stirred until sufficiently homogeneous. Thereafter any solvent is removed by evaporation to give a resin composition. Evaporation is suitably at 50–200° C. and, at least in its final stages, can be at subatmospheric pressure, for example in the range 13.33 Pa to 1333 Pa (0.1 to 10 mm Hg). The resin composition preferably contains up to 5% w/w of volatile solvent, to assist flow when used to impregnate fibres. This residual solvent will be removed in contact with the hot rollers of the impregnating machine.

The curable resin composition of the invention may be cured in known manner.

Suitably the composition in form of a resin solution is transferred onto a suitable mould or tool for preparation of a panel, prepreg or the like, the mould or tool having been preheated to a desired degassing temperature. The stable emulsion is combined with any reinforcing, toughening, filling, nucleating materials or agents or the like, and the temperature is raised to initiate curing thereof. Suitably curing is carried out at elevated temperature up to 200° C., preferably in the range of 160 to 200° C., more preferably at about 170–190° C., and with use of elevated pressure to restrain deforming effects of escaping gases, or to restrain void formation, suitably at pressure of up to 10 bar, preferably in the range of 3 to 7 bar abs. Suitably the cure temperature is attained by heating at up to 5° C./min, for example 2° C. to 3° C./min and is maintained for the required period of up to 9 hours, preferably up to 6 hours, for example 3 to 4 hours. Pressure is released throughout and temperature reduced by cooling at up to 5° C./min. for example up to 3° C./min. Post-curing at temperatures in the range of 190° C. to 200° C. may be performed, at atmospheric pressure, employing suitable heating rates to improve the glass transition temperature of the product or otherwise.

The resin composition, possibly containing some volatile solvent already present or newly added, can be used for example as an adhesive or for coating surfaces or for making solid structures by casting possibly in a foamed state. Short fibre reinforcement may be incorporated with composition prior to curing thereof. Preferably a fibre-reinforced composition is made by passing essentially continuous fibre into contact with such resin composition. The resulting impregnated fibrous reinforcing agent may be used alone or together with other materials, for example a further quantity of the same or a different polymer or resin precursor or mixture, to form a shaped article. This technique is described in more detail in EP-A-56703, 102158 and 102159.

A further procedure comprises forming incompletely cured composition into film by for example compression moulding, extrusion, melt-casting or belt-casting, laminating such films to fibrous reinforcing agent in the form of for example a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A 56703, 102158, 102159, can be laminated together by heat and pressure, for example by autoclave, vacuum or compression moulding or by heated rollers, at a temperature above the curing temperature of the thermosetting resin or, if curing has already taken place, above the glass transition temperature of the mixture, conveniently at least 180° C. and typically up to 200° C., and at a pressure in particular in excess of 1 bar, preferably in the range of 1–10 bar.

The resulting multi-ply laminate may be anisotropic in which the fibres are continuous and unidirectional, orientated essentially parallel to one another, or quasi-isotropic in each ply of which the fibres are orientated at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions. Woven fabrics are an example of quasi-isotropic or intermediate between anisotropic and quasi-isotropic.

A resin composition may be obtained employing a curing agent as disclosed in PCT/IB/00701, the contents of which are incorporated herein by reference, whereby the curable resin composition is adapted to be cured at a temperature of less than that at which the material constituting the mould or tool on or in which it is intended to cure the resin composition becomes heat sensitive in any way, and more preferably at a temperature of less than or equal to 200° C. at elevated pressure, most preferably at a temperature of less than or equal to 180° C. at a pressure in the range of 3 to 7 bar. Suitably such composition is adapted to be cured over a period of less than or equal 6 hours, preferably less than or equal to 4 hours, most preferably of the order of less than or equal to 3 hours.

In a further aspect of the invention there is provided a method for the manufacture of a thermoset resin comprising obtaining the resin composition in a suitable mould or tool, or equivalent state in which it is to be formed subjecting the composition to a desired elevated temperature at suitable pressure, for example at atmospheric pressure and maintaining the temperature for a required period. Preferably the temperature is selected as hereinbefore defined, with reference to the temperature sensitivity of a mould or the like which is being employed or otherwise, more preferably is less than or equal to 150° C. at elevated pressure. Preferably the time is determined as hereinbefore defined.

In a further aspect of the invention there is provided the use of a composite mould or tool to contain or support a composition according to the invention as hereinbefore defined during the forming thereof. Preferably such composite tool is constructed of any suitable unsaturated polyester or thermoset resin such as epoxy or bis-maleimides having a heat resistance in excess of the forming temperature to be employed. Reinforcement is suitably provided in the form of glass fibres. Composite moulds may be prepared in conventional manner for use according to the present invention.

In a further aspect of the invention there is provided a prepreg comprising a composition as hereinbefore defined and continuous fibres, obtained by a process as hereinbefore defined.

In a further aspect of the invention there is provided a composite comprising a pre-preg as hereinbefore defined.

In a further aspect of the invention there is provided a thermoplast or a thermoplast-modified thermoset resin shaped product comprising a composition, pre-preg or composite as hereinbefore defined, which is obtained by the method as hereinbefore defined. Preferably such product is selected from components for use in aeronautical, land or nautical vehicle, building or commercial applications.

In a further aspect of the invention there is provided a polymer composition, resin composition, composite or prepreg as hereinbefore defined for use as an aeronautical, land or nautical vehicle, building or commercial product or component thereof.

The invention is now illustrated in non limiting manner with reference to the following examples.

EXAMPLE 1

Synthesis of 40:60 PES:PEES Copolymer, Chlorine Terminated and Calculated to have a Molecular Weight of 7,000

Bisphenol-S (18.42 gms), Dichlorodiphenylsulphone (55.71 gms) and Hydroquinone (12.16 gms) were charged to a 3 necked round bottomed flask. Sulpholane (194 mls) was added to the reactants. The reaction flask was then flushed with nitrogen. The reactants were stirred at RT whilst Potassium Carbonate (26.18 gms) was added. After about 5 minutes heat was applied to the reactor using an oil bath set at 180° C. As the temperature rose the reaction converting Hydroquinone and Bisphenol-S to bisphenates proceeded, water and carbon dioxide were produced. The reaction was held at 180° C. for 30 minutes, and water was vented from the reactor. The temperature was raised again to 205° C. and held for a further 60 minutes. Again during this period a large amount of water was produced. The temperature was raised again to 225° C. and the reaction was completed with a hold time of 4 hours.

Upon completion of the reaction the polymer solution was cooled to <60° C. and the polymer was precipitated into stirring Methanol. The Sulpholane is extremely soluble in Methanol, it is also extremely soluble in water. The polymer was then filtered from the methanol and was then macerated, filtered again and washed several times with water and dilute Acetic Acid until the pH of the effluent was neutral. The polymer was then dried at 100° C. overnight.

As the bisphenate forms it reacts with the DCDPS by displacing the chlorine group producing an ether link and Potassium Chloride, as a biproduct. Bisphenate formation and the displacement of the chlorine groups continues until all of the monomers have been consumed and no more of the bisphenate remains. The resulting polymer is chlorine terminated.

EXAMPLE 1.1

Synthesis of 40:60 PES:PEES Copolymers, Chlorine Terminated, Calculated Molecular Weight 3000–15000

Polymers were synthesised using the procedure described in Example 1 utilising Sulpholane as the polymerisation solvent, and using calculated amount of monomers such that all polymers were Chlorine terminated.

Depending upon the calculated molecular weight the polymer precipitant can be in the form of a fine powder (mol weight<5,000) and also as coarse/wire like precipitant (mol weight>9,000).

EXAMPLE 1.2

Characterisation of Polymers

The dried polymers where characterised by their reduced viscosity (measured as a 1% solution in DMF at 25° C.) their molecular weight distribution (using Gel Permeation Chromatography (GPC)), and their end group chemistry and molecular weight in terms of an Mn value (using Nuclear Magnetic Resonance (NMR)).

The results are shown in Tables 1.1 and 1.2 and FIG. 1.1.

TABLE 1.1

Molecular Weight Series of 40:60 PES:PEES Copolymers.

| Calculated Molecular Weight | Reduced Viscosity (1% in DMF) | End Groups* (NMR) | Mn (NMR) |
|---|---|---|---|
| 3000.00 | 0.13 | 14.5 CL | 3700.00 |
| 5000.00 | 0.18 | 9.4 CL | 5700.00 |
| 7000.00 | 0.23 | 6.4 CL | 8500.00 |
| 9000.00 | 0.28 | 5.3 CL | 10200.00 |
| 10000.00 | 0.30 | 3.9 CL | 13847.00 |
| 15000.00 | 0.42 | 2.5 CL | 21700.00 |

*End groups per 100 repeat unit

The calculated polymer molecular weights can be produced with a high degree of accuracy, and have a linear relationship with Mn (NMR).

The polymers obtained by the process of Example 1 have been repeated several times and are highly reproducible, in each case the Reduced Viscosity standard deviation varies for any calculated molecular weight by –0.01.

TABLE 1.2

| Calculated Mol Weight | Mw | Mn | Mw/Mn (polydispersity) |
|---|---|---|---|
| 15000.00 | 53400.00 | 21000.00 | 2.54 |
| 9000.00 | 32200.00 | 15400.00 | 2.09 |
| 7000.00 | 27400.00 | 14300.00 | 1.92 |
| 5000.00 | 18700.00 | 10700.00 | 1.75 |
| 3000.00 | 12500.00 | 7800.00 | 1.60 |

A plot of log of Mw against dWf/dLog[M] can be seen in FIG. 1.1. This shows the molecular weight control which can be obtained with the process of Example 1.

Observing the data in Table 1.2 a clear trend can be seen considering the polydispersity of the polymers. As the calculated molecular weight becomes less then the Mw/Mn approaches 1.0. This suagests that the average length of the polymer chains are becoming much more uniform as the molecular weight of the polymer becomes smaller.

EXAMPLE 1.3

Synthesis of a Series of PES:PEES Copolymers

The process of Example 1 was used to synthesis polymers having varied ratios of PES:DEES. The results are shown in Table 1.3.

TABLE 1.3

PES:PEES Copolymers Molecular Weights Calculated to be 7,000 and all Chlorine Terminated.

| PES:PEES | Reduced Viscosity | End Groups (NMR) | Mn (NMR) |
|---|---|---|---|
| 100:0 | 0.22 | 4.5 CL | 10300.00 |
| 90:10 | 0.24 | 4.7 CL | 9913.00 |
| 80:20 | 0.24 | 5.2 CL | 9161.00 |
| 70:30 | 0.25 | 4.7 CL | 10433.00 |
| 60:40 | 0.24 | 5.2 CL | 9709.00 |
| 50:50 | 0.23 | 5.4 CL | 9591.00 |
| 40:60 | 0.24 | 5.9 CL | 9200.00 |
| 30:70 | 0.25 | 6.0 CL | 9232.00 |
| 20:80 | 0.27 | 7.1 CL | 8521.00 |
| 10:90 | INSOLUBLE | — | — |
| 0:100 | INSOLUBLE | — | — |

The copolymers containing higher levels of PEES appear to be insoluble in DMF and the solvents used by NMR due to the high level of crystallinity (40%). It was thought that the polymers had become highly crystalline due to the cooling of the polymer from the Sulpholane solvent.

Comparative Example 1

Synthesis of 40:60 PES:PEES Copolymer, Chlorine Terminated Using the DPS Solvent and Solid Phase Isolation A copolymer was obtained using the prior art process as hereinbefore described on page 3. This process employs time-temperature profiling as for Example 1 but including additional holds at 265° C. and 280° C., which are unfavourable for processing reasons.

To ensure that the polymer had not been affected using the process of Example 1 due to the polymer solvent and final polymerisation temperature employed, polymer samples were compared.

1. Cl ended 40:60 PES:PEES Copolymer synthesised from DPS with solid phase isolation (Comparative Example 1), Reduced Viscosity=0.24
2. Cl ended 40:60 PES:PEES Copolymer synthesised according to Example 1, Reduced Viscosity=0.24
3. Amine terminated KM resin (commercially produced by CEL), Reduced Viscosity=0.24

Comparison of $C^{13}$ NMR revealed that all the polymers were identical. The sequencing within the backbones of the polymers were completely random and in fact the NMR traces could be completely superimposed one on top of the other.

4. KM119 resin (commercially produced by Fiberite Inc) Mn=7700 and Mw=17200.
5. Cl ended 40:60 PES:PEES Copolymer synthesised according to Example 1. Mn=7320 and Mw=17000.

Comparison of GPC traces of sample 4 (FIG. 1.2) with sample 5 (FIG. 1.3) clearly shows that the two traces are completely superimposable. This demonstrates that the molecular weight distribution of both materials are identical.

EXAMPLE 2

Synthesis of 40:60 PES:PEES Copolymer, Hydroxyl Terminated and Calculated to have a Molecular Weight of 7,000

Bisphenol-S (18.92 gms) Dichlorodiphenylsulphone (52.84 gms) and Hydroquinone (12.49 gms) were charged to a 3 necked round bottomed flask. Sulpholane (194 mls) was added to the reactants. The reaction flask was then flushed with nitrogen. The reactants were stirred at RT whilst Potassium Carbonate (27.60 gms) was added. The reaction and isolation was as described in Example 1 above. The process is advantageous since end-capping component is provided by a repeating monomer component, simplifying measurement of starting materials and accuracy of the process.

EXAMPLE 2.1

Synthesis of Copolymers, Hydroxyl Terminated, Calculated Molecular Weight 5000–15000

Polymers were synthesised using the procedure described in Example 2, using Sulpholane as the polymerisation solvent, and using calculated amounts of monomers, such that all polymers were Hydroxyl terminated.

EXAMPLE 2.3

Characterisation of Polymers

The dried polymers were characterised by their reduced viscosity (measured as a 1% solution in DMF, 25° C.), their molecular weight distribution (using Gel Permeation Chromatography (GPC)), and their end group chemistry and molecular weight in terms of an Mn value (using Nuclear Magnetic Resonance (NMR)).

TABLE 2.1

Molecular Weight Series of 40:60 PES:PEES Copolymers.

| Calculated Molecular Weight | Reduced Viscosity (1% in DMF) | End Groups* (NMR) | Mn (NMR) |
|---|---|---|---|
| 5000.00 | 0.26 | 5.2 OH | 10548.00 |
| 7000 00 | 0.30 | 3.7 OH | 14824.00 |
| 9000.00 | 0.33 | 3.0 OH | 18205 00 |
| 12000.00 | 0.38 | 2.8 OH | 19472.00 |
| 15000.00 | 0.43 | 2.0 OH | 27,237 |

*End groups per 100 repeat unit

The GPC data in the form of a plot of log of Mw against dWF/dLog [M] can be seen in FIG. 2.1. This shows not only the molecular weight control which can be obtained with the process of the invention, but also the weight distribution control, whereby a similar distribution is seen going to higher molecular weights for a higher weight range.

From examination of the polymer characteristics, in Table 2.1 it can be clearly seen that as the calculated molecular weight was increased a linear response to the actual molecular weight was achieved.

All of the polymers represented in Table 2.1, possessed 100% hydroxyl end groups.

EXAMPLE 2.4

Preparation of a Thermoplast:Thermoset Formulation Cured into Neat Resin Castings Epoxy component (MY0510, 26.5 parts by weight and PY306, 27.7 parts by weight) were preweighed into a 250 ml tin. Dichloromethane was added as a solvent prior to the addition of a polymer represented in Table 2.1. Upon solublisation, 4,4-DDS (20.76 parts per weight) was added and the volume of the solvent reduced to a level by which the resin mixture could be added to a 15 cm by 10 cm open cast metal mould, which has been previously heated to the desired degassing temperature. The resin solution was then degassed for 45 minutes under vacuum, after which the oven temperature was increased to cure temperature of 180° C. and the vacuum removed.

Cured laminates were assessed for their neat resin mechanical properties and also for the morphologies of the systems. The results are shown in Table 2.2.

TABLE 2.2

Neat Resin Mechanical Properties of Polymers of Table 2.1

| Calculated Molecular Weight | Flexural Modulus (GPa) | Yield Strength (MPa) | Fracture Strength (MPam$^{-3/2}$) | Fracture Toughness (kJm$^{-2}$) | Ductility Factor (mm) |
|---|---|---|---|---|---|
| 5000.00 | 3.50 | 158.00 | 1.50 | 0.73 | 0.15 |
| 12000.00 | 3.60 | 155.00 | 1.92 | 1.18 | 0.26 |
| 15000.00 | 3.50 | 159.00 | 2.17 | 1.43 | 0.31 |

The data shows that resin castings have excellent mechanical properties for weight range up to 20,000. This allows selection of polymer for formulation and processing convenience by weight range, without compromise of mechanical properties.

The morphologies of those materials detailed in Table 2.1 can be seen in FIGS. 2.1–2.3.

The morphologies in FIG. 2.1 represents the phase structure of polymer having MW 5000 (Mn of 10,000). It's morphology appears as a coarse co-continuous phase structure.

The morphology associated with FIG. 2.2 has manifested itself as a partially phase inverted/co-continuous structure, for the polymer having MW 12000 (Mn of 19,000).

FIG. 2.3 represents the morphology of polymer having Mw 15,000 (>20,000 Mn and comprises a fully phase inverted structure.

EXAMPLE 3

Synthesis of Amine Terminated 40:60 PES:PEES Copolymers, Calculated Molecular Weight 10,000

Bisphenol-S (21.05 gms), Dichlorodiphenyl sulphone (62.69 gms), Hydroquinone (13.98 gms) and m-aminophenol (1.75 gms) were charged to a 500 cm$^3$, three necked, round bottomed flask. Results reported here are based on reactions carried out in both 500 cm$^3$ and 2000 cm$^3$ reaction vessels.

Sulpholane (230 cm$^3$) was added and the reactants were stirred, under an atmosphere of nitrogen, before the Potassium Carbonate (31.03 gms) was added. The reaction and isolation were carried out as described in Example 1 above.

EXAMPLE 3.1

Molecular Weight Series of 40:60 PES:PEES Copolymer Manufactured on the 500 cm$^3$ Scale The synthesis of the PES:PEES Copolymers as described in Example 3 was carried out for the following series of polymers. The level of MAP incorporation was based on end-capping the polymers with 2 moles of the amine source, without any excess, 100% based on MAP stoichiometry. The Potassium Carbonate used in all the polymerisations was based on a 3.0% excess.

EXAMPLE 3.2

Characterisation of Polymers

The polymers were characterised as described in Example 2.2 above. The results are given in Table 3.1.

TABLE 3.1

| Calculated Molecular Weight | Reduced Viscosity (1% in DMF) | End Groups as determined by NMR 100 repeat unit | % NH$_2$ | Mn as determined by NMR |
|---|---|---|---|---|
| 7,000 | 0.21 | 0.8 OH, 6.5 NH$_2$ | 89 | 7,462 |
| 8,000 | 0.22 | 0.8 OH, 5.6 NH$_2$ | 88 | 7,782 |
| 9,000 | 0.23 | 0.8 OH, 4.9 NH$_2$ | 87 | 9,573 |
| 10,000 | 0.24 | 0.9 OH, 4.6 NH$_2$ | 84 | 9,900 |
| 12,000 | 0.26 | 0.9 OH, 3.3 NH$_2$ | 79 | 11,852 |
| 20,000 | 0.33 | 0.7 OH, 2.2 NH$_2$ | 76 | 18,800 |

From Table 3.1 is shown that the polymers follow a molecular weight trend based on changing the calculated molecular weight and fixing the MAP addition at 100%, based on stoichiometry. All of the polymers possess only reactive end groups with the level of amine, in many cases, being above 80%.

EXAMPLE 3.3

Preparation of Neat Resin Castings

Neat resin castings were obtained using the process of Example 2.4 above.

TABLE 3.2

Mechanical Characterization of Resin Castings

| Calculated Molecular Weight | Yield Strength (MPa) | Modulus (GPa) | Fracture Toughness (kJm$^{-2}$) | Fracture Strength (Mpam$^{-3/2}$) | Ductility Factor (mm) |
|---|---|---|---|---|---|
| 7,000 | 160 | 3.8 | 0.61 | 1.38 | 0.13 |
| 9,000 | 162 | 3.4 | 0.59 | 1.36 | 0.12 |
| 12,000 | 158 | 3.4 | 0.69 | 1.41 | 0.14 |
| 20,000 | 161 | 3.5 | 0.76 | 1.58 | 0.16 |

The results in Table 3.2 show that the neat resin mechanical properties appear to be approximately the same over the molecular weight studied.

This would appear to suggest that throughout the molecular weight range any of the polymers will produce excellent levels of toughness.

Comparative Example 3

A neat resin casting was made using the process of Example 3.3 above for a commercial KM resin (available from Fiberite Inc.) having Mn 8,300, MW 23,000, RV 0.22 and 85% amine ends and 15% hydroxyl ends. A comparison of the resin casting mechanical properties in Table 3.3 with properties in Table 3.2 is identical showing the commercial suitability of resin castings of the invention.

TABLE 3.3

| Flexural Modulus | Yield Strength | Fracture Strength | Fracture Toughness | Ductility Factor |
|---|---|---|---|---|
| 3 | 161 | 1.18 | 0.5 | 0.09 |
| 3.6 | 167 | 1.23 | 0.5 | 0.09 |

Morphologies (TEM) of the cured neat resin materials detailed in Table 3.2 can be seen in FIGS. 3.3–3.6.

The morphology in FIG. 3.3 for polymer resin with MW 7000 (Mn of 7,462) appears as a possible fine co-continuous phase. The phase size increases in coarseness as the molecular weight rises from MW-9,000 to 12,000 (Mn 9,573 to 11,852)in FIGS. 3.4 and 3.5 respectively.

When the molecular weight goes above 12,000 the morphology appears as a fairly coarse morphology which appears to be between a co-continuous and phase inserted system, as seen in FIG. 3.6. The results indicate viscosity is proportional to molecular weight, allowing selection of low molecular weight polymer where it is required to get a good wet-out in resin casting.

EXAMPLE 3.4

Molecular Weight Series of 40:60 PES:PEES Copolymer Based on a Reduced Level of M-Aminophenol The synthesis for the PES:PEES Copolymers as described under Example 3 was carried out for the following series of polymers. The level of MAP addition was based on a 1.7 mole addition of the amine source as an end-capper, 85% based on MAP stoichiometry. The amount of Potassium Carbonate used was based on a 3.0% excess. The results are shown in Table 3.4 and FIGS. 3.1 and 3.2, referring also to Example 3.2 above.

TABLE 3.4

Mechanical Data for 85% MAP Stoichiometry Polymers.

| Calculated Molecular Weight | Reduced Viscosity (1% in DMF) | End Groups as determined by NMR 100 repeat unit | % NH2 | Mn as determined by NMR |
|---|---|---|---|---|
| 7,000 | 0.21 | 0.5 OH, 5.3 NH$_2$ | 91 | 9,392 |
| 8,000 | 0.22 | 0.3 OH, 4.7 NH$_2$ | 94 | 10,885 |
| 9,000 | 0.24 | 0.5 OH, 4.3 NH$_2$ | 90 | 11,339 |
| 10,000 | 0.25 | 0.7 OH, 3.8 NH$_2$ | 84 | 12,251 |
| 12,000 | 0.28 | 0.9 OH, 3.1 NH$_2$ | 78 | 13,583 |
| 20,000 | 0.35 | 0.8 OH, 2.0 NH$_2$ | 72 | 18,095 |

The results from Table 3.4 can be compared to the results from Table 3.1 and show that the polymers only differ in the values of the actual molecular weight for the same given calculated molecular weight. Also some of the lower calculated molecular weight polymers appear to give slightly higher levels of amine ends.

A plot of reduced viscosity against calculated molecular weight is shown in FIG. 3.5. It can be clearly seen that the level of m-aminophenol causes a shift in weight range for a given molecular weight of the polymers as described by their RV's. This allows variation of RV for any given molecular weight. A plot of Mn values for the polymers as a function of calculated molecular weight is shown in FIG. 3.6. As was the case with the RV data in FIG. 3.5 the effect upon the polymer molecular weight as a function of the level of MAP used can be clearly seen.

A comparison of GPC data showed that the molecular weight remained constant but that the distribution varied in the above case.

The polymers were formulated as resin castings using the process of Example 3.3 above and assessed, as shown in Table 3.5.

TABLE 3.5

Mechanical Properties of Resin Castings.

| Calculated Molecular Weight | Yield Strength (MPa) | Modulus (GPa) | Fracture Toughness (kJm$^{-2}$) | Fracture Strength (MPam$^{-2/2}$) | Ductility Factor (mm) |
|---|---|---|---|---|---|
| 7,000 | 161 | 3.6 | 0.59 | 1.35 | 0.12 |
| 9,000 | 161 | 3.4 | 0.65 | 1.46 | 0.14 |
| 12,000 | 159 | 3.3 | 0.75 | 1.53 | 0.16 |

The above results are consistent with those given in Table 3.2 and show that the polymers are rising the same level of toughness as would be expected from resin manufactured by prior art routes.

EXAMPLE 3.5

Reproducibility of Process of Example 3

40.60 PES:PEES copolymers were synthesised using the process of Example 3, but varying levels of m-aminophenol. The results are shown in Table 3.6.

TABLE 3.6

Polymers with a Calculated Molecular Weight of 10,000.

| % MAP | End Groups | Mn | % NH$_2$ |
|---|---|---|---|
| 50 | 1.2 CL, 2.2 NH$_2$ | 15,870 | 64.7 |
| 75 | 1.0 OH, 3.4 NH$_2$ | 12,295 | 77.3 |
| 85 | 0.7 OH, 3.8 NH$_2$ | 12,251 | 84 |
| 100 | 0.9 OH, 4.6 NH$_2$ | 9,887 | 83.6 |
| 110 | 1.25 OH, 4.6 NH$_2$ | 9,256 | 78.6 |

The information in Table 3.6 reveals that the m-aminophenol, in theory could be undercharged by as much as 25% and the polymer will still have 100% reactive ends giving desired properties. Even if the m-aminophenol was overcharged by as much as 10% the polymer will still meet the requirements.

EXAMPLE 3.6

Reproducibility of Process for Scale of Production

Polymer properties of the 40:60 PES:PEES Copolymers were determined for the following scales, as variant of the 500 cm$^3$ scale of Example 3.

TABLE 3.7

250 cm$^3$ Scale

| Calculated M wt | Mn by NMR | Reduced Viscosity | End Groups by NMR |
|---|---|---|---|
| 7,000 | 7,500 | 0.21 | 89% Amine, 11% Hydroxyl |
| 8,000 | 7,782 | 0.22 | 88% Amine, 12% Hydroxyl |
| 9,000 | 9,537 | 0.23 | 87% Amine, 13% Hydroxyl |
| 10,000 | 10,866 | 0.23 | 86% Amine, 14% Hydroxyl |
| 12,000 | 11,852 | 0.26 | 79% Amine, 21% Hydroxyl |

TABLE 3.8

2 Litre Scale.

| Calculated Molecular Weight | Reduced Viscosity | End Groups as determined by NMR | % NH$_2$ | Mn as determined by NMR |
|---|---|---|---|---|
| 7,000 | 0.21 | 0.8 OH, 4.6 NH$_2$ | 84.2 | 9,102 |
| 10,000 | 0.24 | 0.8 OH, 4.6 NH$_2$ | 84.2 | 10,100 |
| 12,000 | 0.28 | 0.8 OH, 3.2 NH$_2$ | 80 | 13,500 |
| 15,000 | 0.29 | 0.7 OH, 2.6 NH$_2$ | 79 | 16,422 |

TABLE 3.9

50 Litre Scale.

| Calculated M wt | Mn by NMR | Reduced Viscosity | End Groups by NMR |
|---|---|---|---|
| 7,000 | 7,976 | 0.21 | 87% Amine, 13% Hydroxyl |
| 8,000 | 8,380 | 0.22 | 86% Amine, 14% Hydroxyl |
| 9,000 | 9,400 | 0.23 | 86% Amine, 14% Hydroxyl |
| 10,000 | 10,466 | 0.24 | 87% Amine, 13% Hydroxyl |
| 12,000 | 11,339 | 0.27 | 83% Amine, 17% Hydroxyl |

TABLE 3.10

350 Litre Scale
On this scale the calculated molecular weight of 9,000 was repeated a number of times.

| Calculated M wt | Mn by NMR | Reduced Viscosity | End Groups by NMR |
|---|---|---|---|
| 9,000 | 9,540 | 0.24 | 81% Amine, 19% Hydroxyl |
| 9,000 | 9,384 | 0.24 | 86% Amine, 14% Hydroxyl |
| 9,000 | 9,548 | 0.24 | 83% Amine, 17% Hydroxyl |
| 9,000 | 9,225 | 0.24 | 88% Amine, 12% Hydroxyl |
| 9,000 | 9,565 | 0.24 | 79% Amine, 2% Hydroxyl |

A comparison of the data displayed in Tables 3.7 to 3.10 with the data shown in Tables 3.1 and 3.4 show that with experimental error the polymer properties of the different scale derived polymers, are very similar.

The end groups on both sets of polymers are identical in nature and amounts.

What is claimed is:

1. Process for the preparation of a polymer composition comprising at least one polyarylether or a mixture thereof, the process, conducted in substantial absence of an effective amount of an azeotrope, comprising:
   i) obtaining a reaction mixture comprising polymer precursors in a first fluid boiling in excess of 100° C.;
   ii) subjecting the reaction mixture to a first elevated temperature in excess of 100° C. to generate the alkali metal salts of polymer precursors and the polymer reaction products thereof; and
   iii) subjecting the reaction product mixture to at least a second temperature and isolating the reaction product in the form of a polymer composition which is substantially insoluble in a second fluid, from the first fluid which is substantially soluble in the second fluid, by contacting with an amount of second fluid;
   wherein the polymer precursors comprise one or more dihalides and one or more bisphenols of the formula

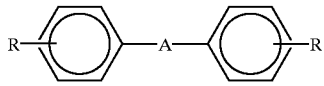

wherein A is a direct link, oxygen, sulphur, —CO—, SO$_2$ or a divalent hydrocarbon radical,
   substituents R are respectively OH or halo, and
   optionally further substituted by any one or more substituents R of the aromatic rings, each independently selected from hydrogen, C$_{1-8}$ branched or straight chain aliphatic saturated or unsaturated aliphatic groups optionally comprising one or more heteroatoms selected from O, S, N and halo; and groups providing active hydrogen selected from OH, NH$_2$, NHR— and —SH, where R— is a hydrocarbon group containing up to eight carbon atoms, or providing other cross-linking activity selected from epoxy, (meth)acrylate, cyanate, isocyanate, acetylene and ethylene, as in vinyl, allyl or maleimide, anhydride, oxazoline and monomers containing saturation; and
   together with a substituted monophenol end-capping component in which the substituent is a reactive group Y which is a group reactive with epoxide groups or with curing agent or with like groups on other polymer molecules, and
   an alkali metal salt which serves to ensure formation of bisphenates by elimination of water from bisphenols.

2. Process for the preparation of a polymer composition comprising at least one polyarylether wherein the at least one polyarylether comprises at least one polyaryl sulphone comprising ether-linked repeating units, optionally additionally comprising thioether-linked repeating units, the units being selected from the group consisting of
   —(PhSO$_2$Ph)$_n$—
   and optionally additionally
   —(Ph)$_a$—
   wherein Ph is phenylene, n=1 to 2 and can be fractional, a=1 to 3 and can be fractional and when a exceeds 1, said phenylenes are linked linearly through a single chemical bond or a divalent group other than —SO$_2$— or are fused together, provided that the repeating unit —(PhSO$_2$Ph)$_n$— is always present in said at least one polyarylsulphone in such a proportion that on average at least two of said units —(PhSO$_2$Ph)$_n$— are in sequence in each polymer chain present, said at least one polyarylsulphone having reactive pendant and/or end groups or a mixture thereof, the process comprising:
   i) obtaining a reaction mixture comprising polymer precursors in a first fluid boiling in excess of 100° C.;
   ii) subjecting the reaction mixture to a first elevated temperature in excess of 100° C. to generate the alkali metal salts of polymer precursors and the polymer reaction products thereof; and
   iii) subjecting the reaction product mixture to at least a second temperature and isolating the reaction product in the form of a polymer composition which is substantially insoluble in a second fluid, from the first fluid which is substantially soluble in the second fluid, by contacting with an amount of second fluid;

wherein the process is conducted in substantial absence of an effective amount of an azeotrope.

3. Process as claimed in claim 1 wherein Y is selected from groups providing active hydrogen, including OH, NH$_2$, NHR', —SH wherein R' is a hydrocarbon group containing up to 8 carbon atoms, or providing other cross-linking reactivity, selected from epoxy, (meth)acrylate, cyanate, isocyanate, acetylene, ethylene.

4. Process as claimed in claim 3 wherein Y is selected from vinyl, allyl, maleimide, anhydride, oxazoline and monomers containing unsaturation.

5. Process as claimed in claim 1 wherein the second temperature is the aggregate temperature obtained after contacting of the second fluid.

6. Process as claimed in claim 1 wherein the composition is soluble to less than 20% in the second fluid.

7. Process as claimed in claim 1 wherein the first fluid is soluble to more than 50% in the second fluid.

8. Process as claimed in claim 1 wherein the first fluid comprises at least one dipolar aprotic solvent, preferably selected from one or more of sulphur oxides, such as sulphoxides and sulphones, formamides, pyrrolidones, cyclic ketones, for example tetramethylenesulphone (sulpholane) of formula $(CH_2)_4S(O)_2$, dimethylsulphoxide (DMSO) of formula $(CF_3)_2SO$, diphenylsulphone (DPS) of formula $(C_6H_5)_2SO$, dimethylformamide (DMF), dimethylacetamide (DMAC), methyl pyrrolidone (NMP) of formula $C_4H_8NCH_3$ and cyclopentanone.

9. Process as claimed in claim 1 wherein the first fluid boils in the range 100–200° C. for use with highly reactive monomers.

10. Process as claimed in claim 1 wherein the second fluid is selected from alcohols and demineralised water or demineralised aqueous solvents and mixtures thereof.

11. Process as claimed in claim 1 additionally comprising the step, prior to isolation of product, of filtering or otherwise purifying the reaction solution for the removal of solid contaminants such as alkali metal reaction products.

12. Process as claimed in claim 1 wherein isolation is carried out by reducing the reaction mixture to a temperature in the range 90–125° C. and contacting with a second fluid which boils in the range 50–110° C.

13. Process as claimed in claim 1 wherein the at least one polyarylether comprises repeating units of the formula

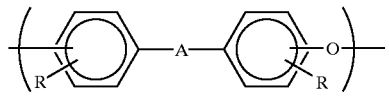

wherein A is a direct link, oxygen, sulphur, —CO— or a divalent hydrocarbon radical;

R is any one or more substituents of the aromatic rings, each independently selected from hydrogen, $C_{1-8}$ branched or straight chain aliphatic saturated or unsaturated aliphatic groups optionally comprising one or more heteroatoms selected from O, S, N and halo; and groups providing active hydrogen selected from OH, NH$_2$, NHR— and —SH, where R— is a hydrocarbon group containing up to eight carbon atoms, or providing other cross-linking activity selected from epoxy, (meth)acrylate, cyanate, isocyanate, acetylene and ethylene, as in vinyl, allyl or maleimide, anhydride, oxazoline and monomers containing saturation; and wherein the said at least one polyarylether comprises reactive pendant and/or end groups.

14. Process as claimed in claim 1 wherein the at least one polyarylether comprises at least one polyaryl sulphone comprising ether-linked repeating units, optionally additionally comprising thioether-linked repeating units, the units being selected from the group consisting of —(PhSO$_2$Ph)$_n$O— and optionally additionally

—(Ph)$_a$O— wherein Ph is phenylene, n=1 to 2 and can be fractional, a=1 to 3 and can be fractional and when a exceeds 1, said phenylenes are linked linearly through a single chemical bond or a divalent group other than —SO$_2$— or are fused together, provided that the repeating unit —(PhSO$_2$Ph)$_n$— is always present in said at least one polyarylsulphone in such a proportion that on average at least two of said units —(PhSO$_2$Ph)$_n$— are in sequence in each polymer chain present, said at least one polyarylsulphone having reactive pendant and/or end groups.

15. Process as claimed in claim 1 wherein the number average molecular weight of the polyarylether is in the range 2000 to 60000.

16. Process as claimed in claim 1 wherein end-capping component is introduced at the outset with the polymer precursors or added in a further amount of first fluid to the reacted polymer components at a further elevated end-capping or quench temperature for a further period.

17. Process as claimed in claim 1 wherein the composition obtained by the process of the invention is further converted to derivatives or analogues of the polyarylether by reaction with a suitable functionalising or derivatising agent.

18. Polyarylether obtained with the process defined in claim 1 wherein the polyarylether is amorphous or semi-crystalline or mixtures thereof.

19. Polyarylether obtained with the process of claim 1 which contains less than 1000 ppm of KCl.

20. A first or second fluid as defined in claim 1, for use in the preparation of a polyarylether using the process of claim 1.

21. Novel intermediates of the process for the preparation of a polyarylether according to claim 1.

22. Resin formulation comprising a polyarylether component obtained by the process of claim 1 and an additional polymer, such as an additional thermoset polymer selected from the group consisting of an epoxy resin, an addition-polymerisation resin, especially a bis-maleimide resin, a formaldehyde condensate resin, especially a formaldehyde-phenol resin, a cyanate resin, an isocyanate resin, a phenolic resin and mixtures of two or more thereof.

23. Prepreg comprising a polyarylether according to claim 18 and continuous fibres.

24. Composite comprising a pre-preg according to claim 23.

25. Method for the manufacture of a pre-preg or composite according to claim 23.

26. Thermoplast or a thermoplast-modified thermoset resin shaped product comprising a polyarylether, pre-preg or composite, as claimed in claim 18.

27. Polyarylether, resin formulation, pre-preg, composite or product as claimed in claim 18 for use in the manufacture of products of the transport industry such as aerospace, aeronautical or automotive land or nautical vehicle industries, rail and coach industries or in building/construction industry, or for use in non-high performance transport applications, non-construction applications and adhesive applications, including high temperature adhesive applications or other commercial applications.

28. Process as claimed in claim 1 wherein the first fluid boils in excess of 200° C. for use with less reactive monomers.

29. Polyarylether obtained with the process of claim 1 which contains less than 500 ppm of KCl.

30. Polyarylether obtained with the process of claim 1 which contains less than 200 ppm of KCl.

31. Polyarylether obtained with the process of claim 1 which contains KCl in the range 10–150 ppm.

* * * * *